United States Patent
Hurley et al.

(10) Patent No.: US 11,120,442 B2
(45) Date of Patent: Sep. 14, 2021

(54) MANAGEMENT OF RELOADABLE CREDENTIALS ON AN ELECTRONIC DEVICE USING AN ONLINE RESOURCE

(71) Applicant: Apple Inc., Cupertino, CA (US)

(72) Inventors: Timothy S. Hurley, Cupertino, CA (US); Ahmer A. Khan, Cupertino, CA (US); George R. Dicker, Sunnyvale, CA (US); Christopher Sharp, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1237 days.

(21) Appl. No.: 14/502,109

(22) Filed: Sep. 30, 2014

(65) Prior Publication Data

US 2015/0371226 A1    Dec. 24, 2015

Related U.S. Application Data

(60) Provisional application No. 62/015,338, filed on Jun. 20, 2014.

(51) Int. Cl.
    *G06Q 20/40* (2012.01)
    *H04L 29/06* (2006.01)
    (Continued)

(52) U.S. Cl.
    CPC ........... *G06Q 20/40* (2013.01); *G06Q 20/108* (2013.01); *G06Q 20/3223* (2013.01);
    (Continued)

(58) Field of Classification Search
    CPC ........... G06Q 2220/00; G06Q 2220/10; G06Q 2220/16; G06Q 20/40; G06Q 20/3223;
    (Continued)

(56) References Cited

U.S. PATENT DOCUMENTS 9,106,273 B2 *   8/2015  Takayama .......... G06K 7/10237
9,530,014 B2 *  12/2016  Assadi .................... G06F 21/44
(Continued)

FOREIGN PATENT DOCUMENTS

CN   101582141 A   11/2009
CN   201532668 U    7/2010
(Continued)

OTHER PUBLICATIONS

Summons to attend oral proceedings, dated Jan. 7, 2020, from European Patent Application No. 15715018.8, 11 pages.
(Continued)

*Primary Examiner* — Dante Ravetti
(74) *Attorney, Agent, or Firm* — Morgan, Lewis & Bockius LLP

(57) ABSTRACT

Systems, methods, and computer-readable media for using an online resource to manage reloadable credentials on an electronic device are provided. In one example embodiment, a method, at an electronic device, includes, inter alia, receiving selection data via an online resource, where the selection data may be indicative of a particular credential applet stored on a secure element of the electronic device, in response to the receiving the selection data, accessing validation data from the particular credential applet on the secure element, transmitting initialization results comprising the accessed validation data to a remote subsystem associated with the online resource, in response to the transmitting, receiving reload data from the remote subsystem, and adjusting a balance of the particular credential applet based on the received reload data. Additional embodiments are also provided.

21 Claims, 10 Drawing Sheets

(51) Int. Cl.
 *G06Q 20/38* (2012.01)
 *G06Q 20/10* (2012.01)
 *G06Q 20/32* (2012.01)
 *G06Q 20/36* (2012.01)

(52) U.S. Cl.
 CPC ..... *G06Q 20/3229* (2013.01); *G06Q 20/3672* (2013.01); *G06Q 20/382* (2013.01); *H04L 63/08* (2013.01)

(58) Field of Classification Search
 CPC .......... G06Q 20/3672; G06Q 20/3229; G06Q 20/382; G06Q 20/108; H04L 63/08
 See application file for complete search history.

(56) References Cited

U.S. PATENT DOCUMENTS

| | | | |
|---|---|---|---|
| 2003/0097382 A1 | 5/2003 | McDonald et al. | |
| 2010/0317318 A1 | 12/2010 | Carter et al. | |
| 2011/0105183 A1 | 5/2011 | Hsiao et al. | |
| 2012/0011228 A1* | 1/2012 | Corda | H04M 1/7253 709/219 |
| 2012/0036076 A1* | 2/2012 | Vanderwall | G06Q 20/28 705/75 |
| 2012/0130839 A1* | 5/2012 | Koh | G06Q 20/352 705/26.1 |
| 2014/0101042 A1 | 4/2014 | Grissom et al. | |
| 2015/0019418 A1* | 1/2015 | Hotard | G06Q 20/36 705/41 |
| 2016/0119287 A1* | 4/2016 | Khazan | H04L 9/14 726/12 |
| 2017/0243197 A1* | 8/2017 | Salvador | G06Q 20/023 |

FOREIGN PATENT DOCUMENTS

| | | |
|---|---|---|
| CN | 103116939 A | 5/2013 |
| CN | 103270526 A | 8/2013 |
| WO | 98/09257 | 3/1998 |

OTHER PUBLICATIONS

Chinese Office Action from Chinese Patent Application No. 201580032927.6, dated Jul. 2, 2019, 40 pages including English language translation.

Chinese Office Action from Chinese Patent Application No. 201580032927.6, dated Nov. 4, 2019, 29 pages including English language translation.

"GlobalPlatform Device Technology—Secure Element Access Control (GPD_SPE_013)," May 2012, retrieved from http://www.globalplatform.org/specificationsdevice.asp, 86 pages.

European Office Action from European Patent Application No. 15715017.8, dated Jun. 25, 2020, 16 pages.

\* cited by examiner

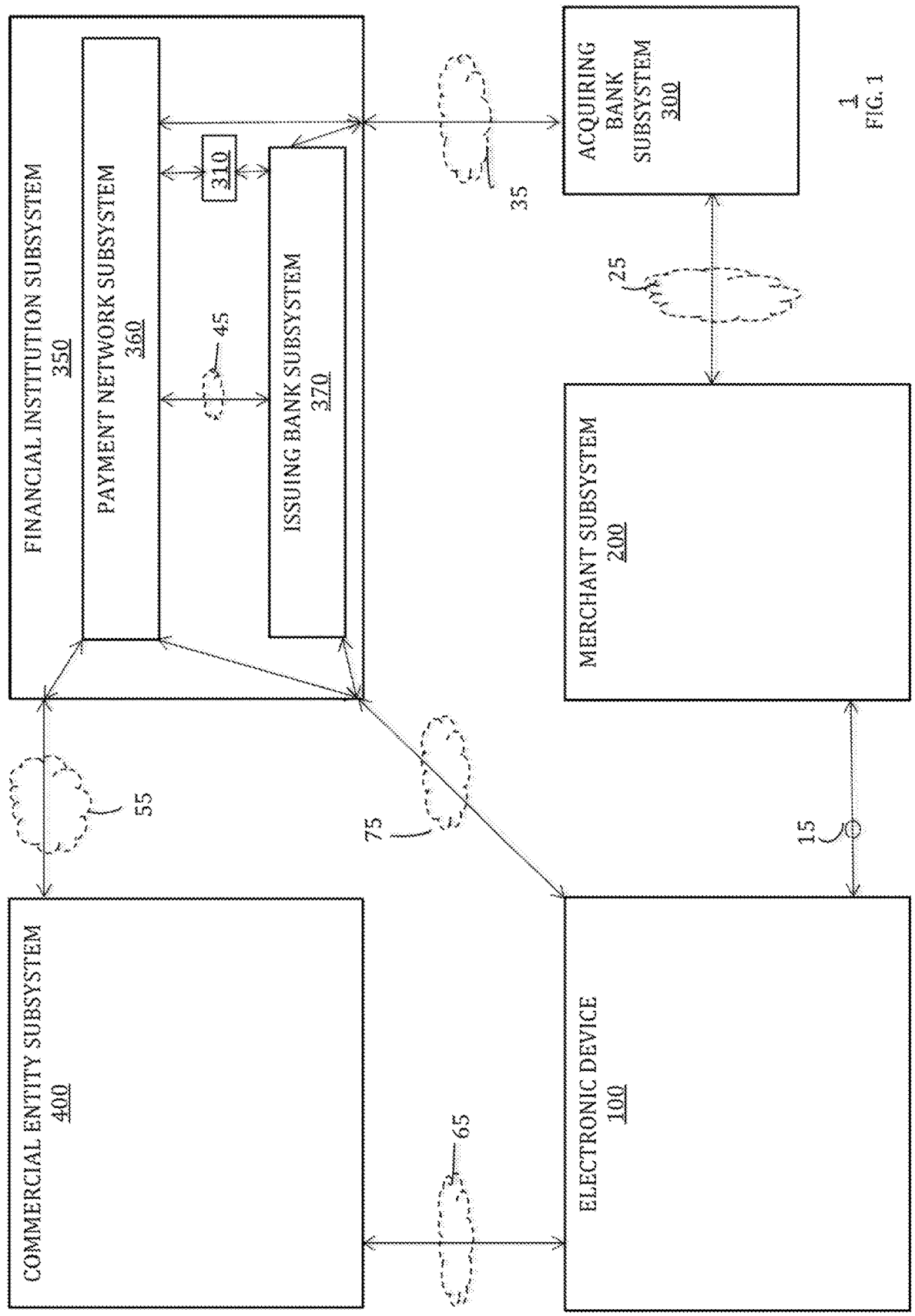

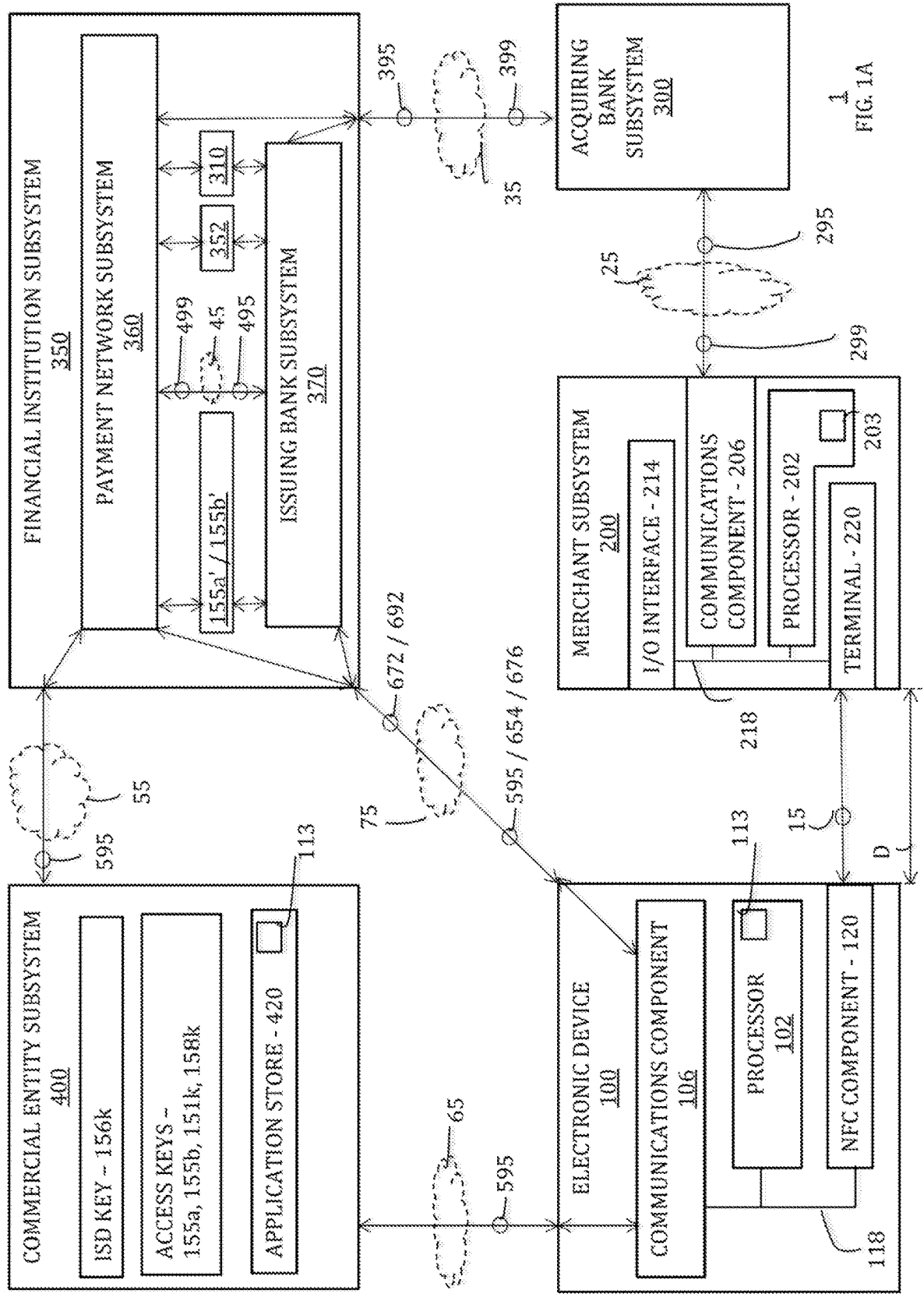

MANAGEMENT OF RELOADABLE CREDENTIALS ON AN ELECTRONIC DEVICE USING AN ONLINE RESOURCE

CROSS-REFERENCE TO RELATED APPLICATION

This application claims the benefit of prior filed U.S. Provisional Patent Application No. 62/015,338, filed Jun. 20, 2014, which is hereby incorporated by reference herein in its entirety.

TECHNICAL FIELD

This disclosure relates to the management of reloadable credentials on an electronic device and, more particularly, to the management of reloadable credentials on an electronic device using an online resource.

BACKGROUND OF THE DISCLOSURE

Portable electronic devices (e.g., cellular telephones) may be provided with near field communication ("NFC") components for enabling contactless proximity-based communications with another entity. Often times, these communications are associated with financial transactions or other secure data transactions that require the electronic device to access and share a commerce credential with the other entity in a contactless proximity-based communication. However, secure and efficient reloading of funds for such a commerce credential on the electronic device using an online resource has heretofore been infeasible.

SUMMARY OF THE DISCLOSURE

This document describes systems, methods, and computer-readable media for using an online resource to manage reloadable credentials on an electronic device.

As an example, a method, at an electronic device, may include receiving selection data via an online resource, where the selection data is indicative of a particular credential applet stored on a secure element of the electronic device. The method may also include, in response to the receiving the selection data, accessing validation data from the particular credential applet on the secure element. The method may also include transmitting initialization results comprising the accessed validation data to a remote subsystem associated with the online resource. The method may also include, in response to the transmitting, receiving reload data from the remote subsystem. The method may also include adjusting a balance of the particular credential applet based on the received reload data.

As another example, an electronic device may include a communication component, an application processor, and a secure element. The application processor may be operative to access an online resource of a bank server, the secure element may be operative to store a reloadable credential applet, the application processor may be operative to receive funding data from the bank server via the communication component, the application processor may be operative to obtain balance data for the reloadable credential applet, the application processor may be operative to provide initial credential management option data via the online resource based on the received account data and based on the obtained balance data, and the application processor may be operative to receive selection data based on the provided initial credential management option data via the online resource, where the received selection data may be indicative of the reloadable credential applet. The application processor may be operative to send an initialization command to the secure element in response to the received selection data, the secure element may be operative to send validation data from the reloadable credential applet to the application processor in response to the initialization command, the application processor may be operative to transmit initialization results comprising the sent validation data to the bank server via the communication component, the application processor may be operative to receive reload data from the bank server based on the transmitted initialization results, the application processor may be operative to send a reload command to the secure element based on the received reload data, and the secure element may be operative to adjust a balance of the reloadable credential applet in response to the reload command.

As another example, a method, at a bank server subsystem, may include receiving initialization results from an electronic device, where the initialization results may include validation data of a credential applet on a secure element of the electronic device. The method may also include validating the validation data of the received initialization results and, in response to the validating, transmitting reload data to the electronic device for adjusting a balance of the credential applet.

As yet another example, a non-transitory computer-readable medium may include computer-readable instructions recorded thereon for receiving selection data via an online resource at an electronic device, where the selection data is indicative of a particular credential applet stored on a secure element of the electronic device, in response to the receiving the selection data, accessing validation data from the particular credential applet on the secure element, transmitting the accessed validation data to a remote subsystem associated with the online resource, in response to the transmitting, receiving reload data from the remote subsystem, and adjusting a balance of the particular credential applet based on the received reload data.

This Summary is provided merely to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 1 is a schematic view of an illustrative system for using an online resource to manage reloadable credentials on an electronic device;

FIG. 1A is another more detailed schematic view of the system of FIG. 1;

DETAILED DESCRIPTION OF THE DISCLOSURE

A commerce credential provisioned and enabled on a secure element of an electronic device may be used for defining a contactless proximity-based communication (e.g., a near field communication) for facilitating a financial transaction between the electronic device and a merchant. When a user of such an electronic device authenticates itself with an account of a bank subsystem via an online resource running on the electronic device (e.g., via an online application or a website that may be managed or otherwise at least partially controlled by the bank subsystem), the device may receive suitable account information indicative of one or more account credentials of that authenticated account. Next, the electronic device may determine and display a current balance of at least one reloadable commerce credential on the secure element that is associated with the authenticated user (e.g., via a user interface of the online resource) for enabling the user to select the reloadable account for adjusting its balance. In response to user selection of such a credential management option, the electronic device may access validation data of the selected reloadable credential (e.g., a cryptogram of a reloadable credential applet of the secure element) and may securely share that validation data with the bank subsystem and/or any other suitable system entities that may validate the validation data of that reloadable credential. If such validation is successful, the bank subsystem may provide reload data to the electronic device that may be utilized by the electronic device to adjust a balance of the reloadable credential on the secure element. Such adjustment may be shared with the online resource for communicating the updated balance to a user of the electronic device via the online resource. The secure element may be configured to receive a first script-based initialization command originating from the online resource that may request the validation data, as well as a second script-based reload command from the online resource that may request the adjustment of the balance of the reloadable credential. The secure element may be configured to execute other commands in between such an initialization command and such a reload command.

Figure 2:
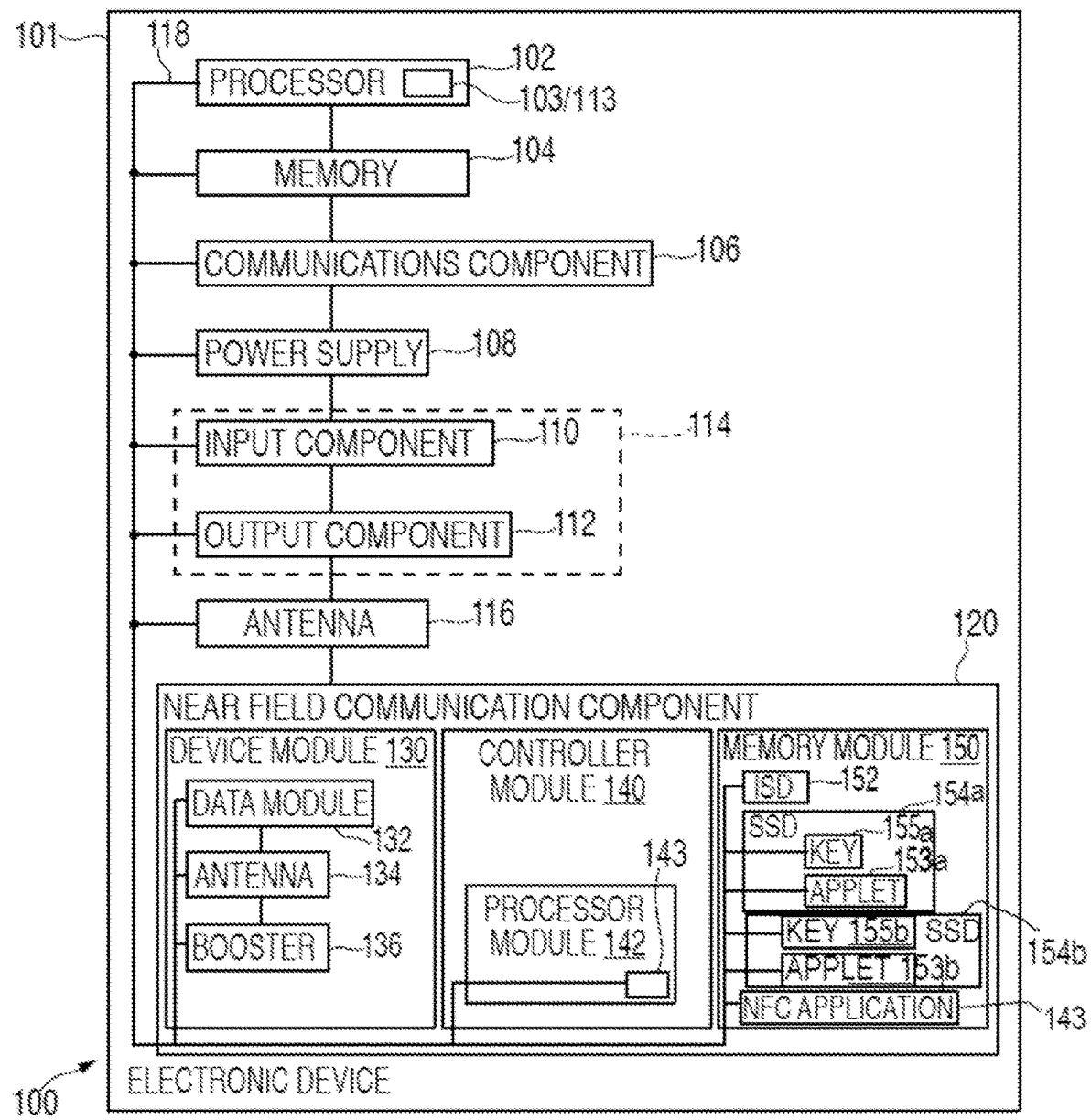
FIG. 2 is a more detailed schematic view of the electronic device of the system of FIGS. 1 and 1A.
Figure 3:
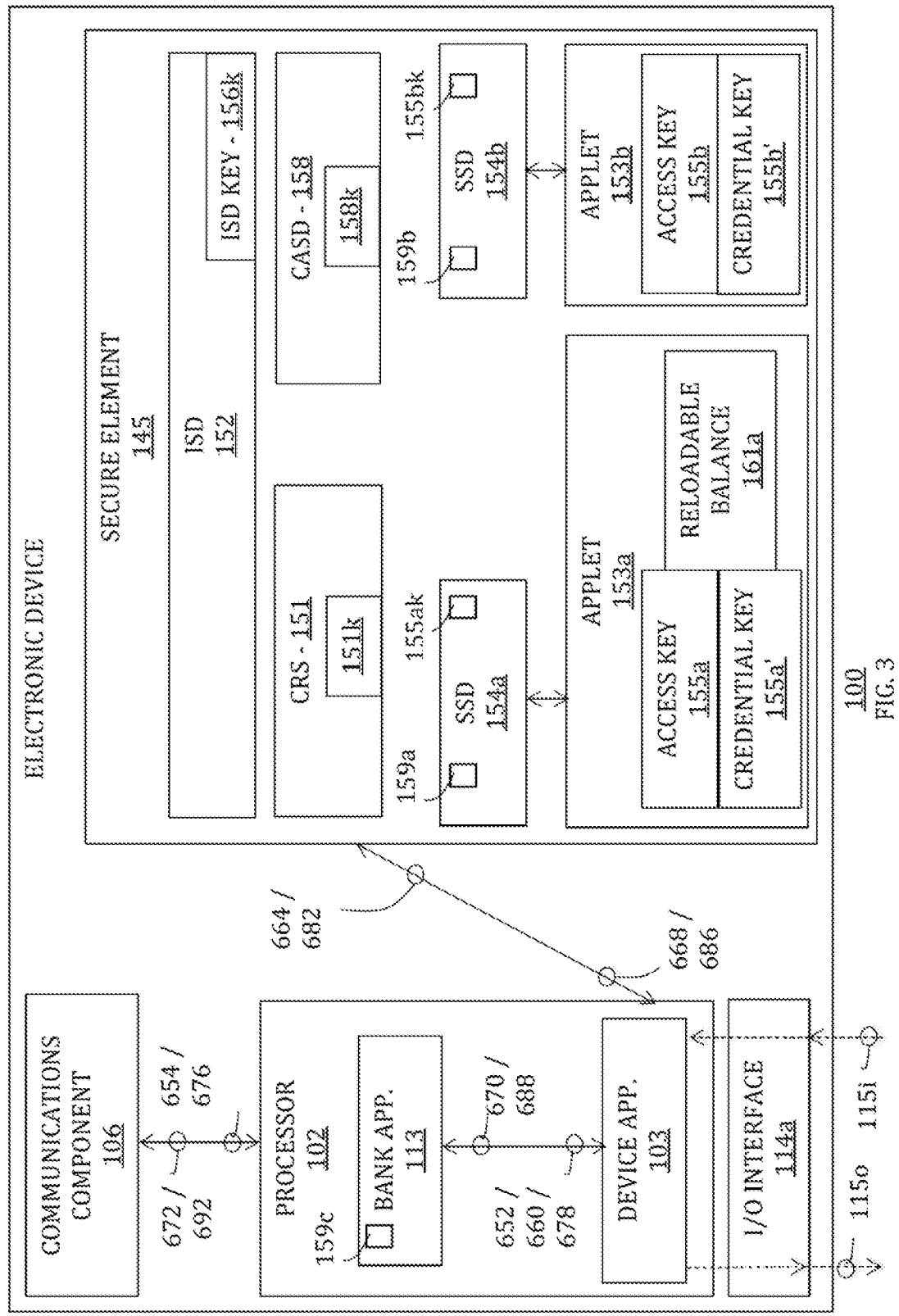
FIG. 3 is another more detailed schematic view of the electronic device of FIGS. 1-2.
Figure 4:
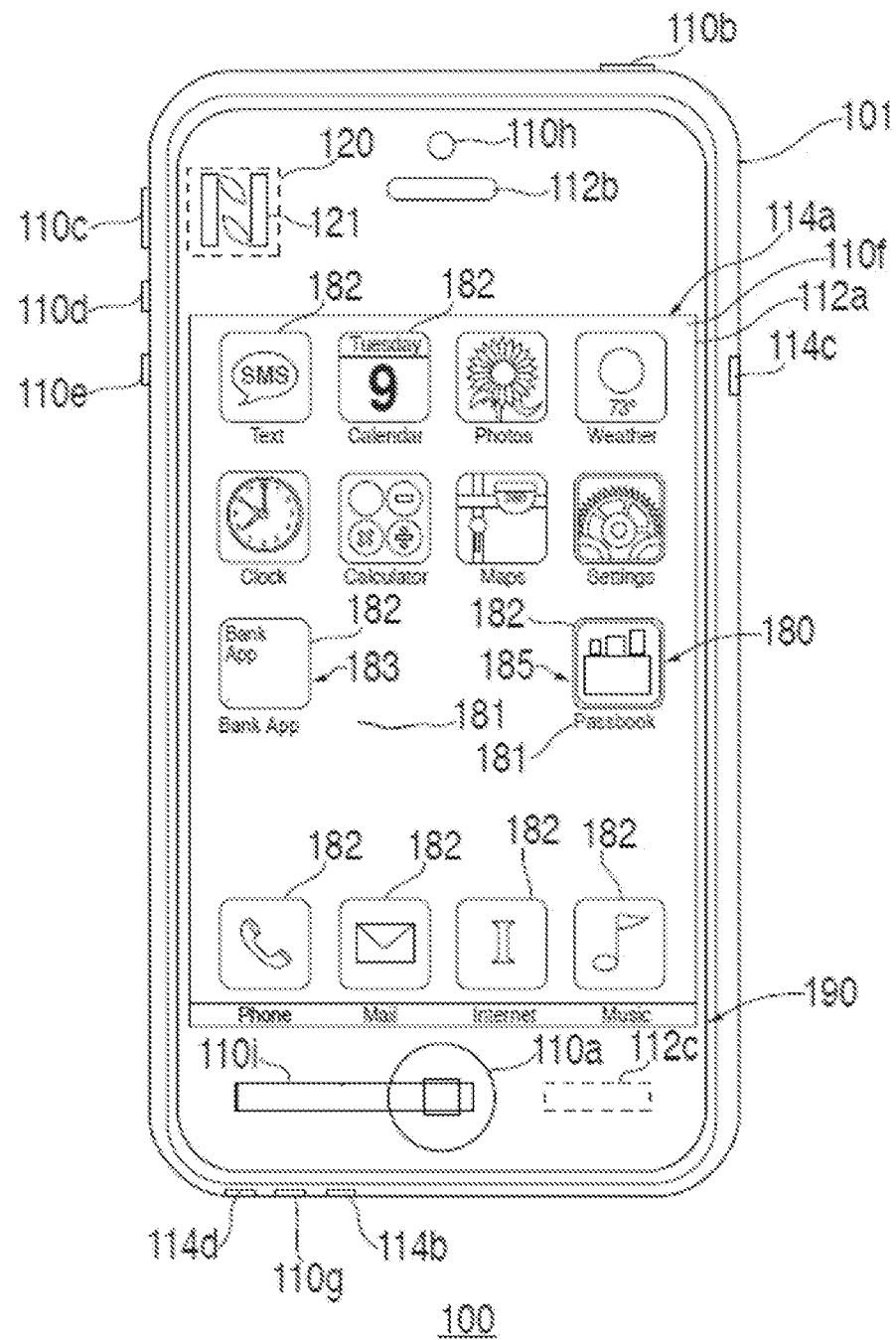
FIG. 4 is a front view of the electronic device of FIGS. 1-3.

FIGS. 1 and 1A show a system 1 in which one or more credentials may be provisioned onto an electronic device 100 from a financial institution subsystem 350 (e.g., in conjunction with a commercial entity subsystem 400), in which at least one of such credentials provisioned on device 100 may be reloaded with funds using an online resource, and in which at least one of such reloaded credentials may be used by electronic device 100 for conducting a financial transaction with a merchant subsystem 200 and an associated acquiring bank subsystem 300. FIGS. 2-4 show further details with respect to particular embodiments of electronic device 100 of system 1, FIGS. 5-8 are flowcharts of illustrative processes for using an online resource to manage reloadable credentials on an electronic device, and FIGS. 9A-9D show example screens 190a-190d that may be representative of a graphical user interface of electronic device 100 during such credential management.

Description of FIG. 1

FIG. 1 is a schematic view of an illustrative system 1 that may allow for the provisioning of a credential onto an electronic device. For example, as shown in FIG. 1, system 1 may include an end-user electronic device 100 as well as a commercial entity subsystem 400 and/or a financial institution subsystem 350 for securely provisioning one or more credentials on electronic device 100. Moreover, system 1 may allow for the reloading of such a provisioned credential with additional funds using an online resource (e.g., an online application or a website that may be managed or otherwise at least partially controlled by a server 310 and that may be accessed by electronic device 100). Moreover, as shown in FIG. 1, system 1 may also include a merchant subsystem 200 for receiving contactless proximity-based communications 15 (e.g., near field communications) from electronic device 100 for enabling payments between a user of electronic device 100 and a merchant of merchant subsystem 200 based on such a reloaded credential. System 1 may also include an acquiring bank subsystem 300 that may utilize such contactless proximity-based communications 15 received by merchant subsystem 200 for completing a financial transaction with financial institution subsystem 350.

System 1 may include a communications path 25 for enabling communication between merchant subsystem 200 and acquiring bank subsystem 300, a communications path 35 for enabling communication between acquiring bank subsystem 300 and financial institution subsystem 350, a communications path 45 for enabling communication between a payment network subsystem 360 of financial institution subsystem 350 and an issuing bank subsystem 370 of financial institution subsystem 350, a communications path 55 for enabling communication between financial institution subsystem 350 and commercial entity subsystem 400, a communications path 65 for enabling communication between commercial entity subsystem 400 and electronic device 100, and a communications path 75 for enabling communication between financial institution subsystem 350 and electronic device 100. One or more of paths 25, 35, 45, 55, 65, and 75 may be at least partially managed by one or more trusted service managers ("TSMs"). Any suitable circuitry, device, system, or combination of these (e.g., a wireless communications infrastructure including one or more communications towers, telecommunications servers, or the like) operative to create a communications network may be used to provide one or more of paths 25, 35, 45, 55, 65, and 75, which may be capable of providing any suitable communications using any suitable wired or wireless communications protocol. For example, one or more of paths 25, 35, 45, 55, 65, and 75 may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

Description of FIG. 1A

Referring now to FIG. 1A, FIG. 1A shows a more detailed view of the system 1 described above with respect to FIG. 1. As shown in FIG. 1A, for example, electronic device 100 may include a processor 102, a communications component 106, and/or a near field communication ("NFC") component 120. NFC component 120 may include a secure element that may be configured to provide a tamper-resistant platform (e.g., as a single or multiple chip secure microcontroller) that may be capable of securely hosting applications and their confidential and cryptographic data (e.g., supplemental security domains ("SSDs") with credential applets, associated credential keys (e.g., credential keys 155a' and 155c', which may also be available to financial institution subsystem 350, as shown in FIG. 1A), and associated access keys (e.g., access keys 155a and 155c, which may also be available to commercial entity subsystem 400 as shown in FIG. 1A), an issuer security domain ("ISD") key (e.g., ISD key 156k which may also be available to commercial entity subsystem 400 as shown in FIG. 1A), a contactless registry services ("CRS") access kit (e.g., CRS access kit 151k, which may also be available to commercial entity subsystem 400 as shown in FIG. 1A), and/or a controlling authority security domain ("CASD") access kit (e.g., CASD access kit 158k, which may also be available to commercial entity subsystem 400 as shown in FIG. 1A), one or more of which may be in accordance with rules and security requirements that may be set forth by a set of well-identified trusted authorities (e.g., an authority of financial institution subsystem and/or an industry standard, such as GlobalPlatform). As described below in more detail, a credential applet of NFC component 120 may be configured to provide sufficient detail for identifying a funding account or other financial instrument or credit source, where information from such a credential applet may be used by electronic device 100 in one or more communications with merchant subsystem 200 for facilitating a financial transaction. Alternatively or additionally, as described below in more detail, a credential applet of NFC component 120 may be configured to provide sufficient detail for identifying a specific value of currency or cash as well as an identification of a controller or manager of that credential, where information from such a credential applet may be used by electronic device 100 in one or more communications with merchant subsystem 200 for facilitating a financial transaction. NFC component 120 may be configured to communicate such credential information as a contactless proximity-based communication 15 (e.g., near field communication) with merchant subsystem 200 (e.g., with a merchant terminal 220 of merchant subsystem 200) to conduct a financial transaction. Alternatively or additionally, communications component 106 may be provided to allow device 100 to communicate any suitable data (e.g., credential information) with one or more other electronic devices or servers or subsystems (e.g., one or more subsystems or other components of system 1) using any suitable wired or wireless protocol (e.g., via one or more of communications paths 55, 65, and/or 75). Processor 102 of electronic device 100 may include any processing circuitry that may be operative to control the operations and performance of one or more components of electronic device 100. For example, processor 102 may be configured to run one or more applications on device 100 (e.g., an online resource or bank application 113) that may at least partially dictate the way in which one or more credentials may be managed on a secure element of NFC component 120 and/or credential data may be communicated between communications component 106 of device 100 and other entities of system 1 (e.g., a bank server 310, commercial entity subsystem 400, and/or financial institution subsystem 350) over the Internet or any other suitable network that may be provided by communications paths 65 and/or 75.

As mentioned, merchant subsystem 200 may include a reader or terminal 220 for detecting, reading, or otherwise receiving NFC communications 15 from electronic device 100 (e.g., when electronic device 100 comes within a certain distance or proximity D of terminal 220). Merchant terminal 220 may be located at a brick and mortar store or any physical location at which a user of electronic device 100 may use a credential stored on NFC component 120 of electronic device 100 to conduct a financial transaction with a proximately located merchant terminal 220 via a contactless proximity-based communication 15. As also shown in FIG. 1A, and as described below in more detail, merchant subsystem 200 may also include a merchant processor component 202 that may be the same as or similar to a processor component 102 of electronic device 100, a merchant application 203 that may be the same as or similar to an application 113 of electronic device 100, a merchant communications component 206 that may be the same as or similar to a communications component 106 of electronic device 100, a merchant input/output ("I/O") interface 214 that may be the same as or similar to an I/O interface of electronic device 100, a merchant bus 218 that may be the same as or similar to bus 118 of electronic device 100, a merchant memory component (not shown) that may be the same as or similar to a memory component of electronic device 100, and/or a merchant power supply component (not shown) that may be the same as or similar to a power supply component of electronic device 100.

Financial institution subsystem 350 may include a payment network subsystem 360 (e.g., a payment card association or a credit card association) and/or an issuing bank subsystem 370. For example, issuing bank subsystem 370 may be a financial institution that may assume primary liability for a consumer's capacity to pay off debts they may incur with a specific credential. Each specific credential applet of NFC component 120 may be associated with a specific payment card that may be electronically linked to an account or accounts of a particular user at financial institution subsystem 350. Various types of payment cards are suitable, including credit cards, debit cards, charge cards, stored-value cards, fleet cards, gift cards, transit cards, and the like, at least some of which may be reloadable. The commerce credential of a specific payment card may be provisioned on electronic device 100 (e.g., as a credential of a credential SSD of NFC component 120, as described below) by financial institution subsystem 350 for use in a commerce credential data communication (e.g., a contactless proximity-based communication 15) with merchant subsystem 200. Each credential may be a specific brand of payment card that may be branded by a payment network subsystem 360. Payment network subsystem 360 may be a network of various issuing banks 370 and/or various acquiring banks that may process the use of payment cards (e.g., commerce credentials) of a specific brand.

When a credential of a secure element of device 100 is provided as a commerce credential data communication to merchant subsystem 200 (e.g., as a contactless proximity-based communication 15 to merchant terminal 220), merchant subsystem 200 may leverage acquiring bank subsystem 300 and/or financial institution subsystem 350 for completing a financial transaction based on that commerce credential data communication. For example, after a user of electronic device 100 has chosen a product or service for purchase and has appropriately enabled a specific credential of device 100 to be used for payment, merchant subsystem 200 may receive an appropriate commerce credential data communication 15 indicative of commerce credential data for the specific credential. Based on such a received commerce credential data communication 15, merchant subsystem 200 may be configured to generate and transmit data 295 to acquiring bank subsystem 300 (e.g., via a communication path 25 between merchant subsystem 200 and acquiring bank subsystem 300), where data 295 may include payment information and an authorization request that may be indicative of the user's commerce credential and the merchant's purchase price for the product or service. Also known as a payment processor or acquirer, acquiring bank subsystem 300 may be a banking partner of the merchant associated with merchant subsystem 200, and acquiring bank subsystem 300 may be configured to work with financial institution subsystem 350 to approve and settle credential transactions attempted by electronic device 100 via a commerce credential data communication with merchant subsystem 200 (e.g., via a contactless proximity-based communication 15). Acquiring bank subsystem 300 may then forward the authorization request from data 295 to financial institution subsystem 350 as data 395 (e.g., via a communication path 35 between acquiring bank subsystem 300 and financial institution subsystem 350).

Payment network subsystem 360 and issuing bank subsystem 370 may be a single entity or separate entities. For example, American Express may be both a payment network subsystem 360 and an issuing bank subsystem 370. In contrast, Visa and MasterCard may be payment networks 360, and may work in cooperation with issuing banks 370, such as Chase, Wells Fargo, Bank of America, and the like. China UnionPay ("CUP") may also be a payment network 360. Financial institution subsystem 350 may also include one or more acquiring banks, such as acquiring bank subsystem 300. For example, acquiring bank subsystem 300 may be the same entity as a payment network subsystem 360 and/or an issuing bank subsystem 370. One, some, or all components of acquiring bank subsystem 300 may be implemented using one or more processor components, which may be the same as or similar to processor component 102 of device 100, one or more memory components, which may be the same as or similar to a memory component of device 100, and/or one or more communications components, which may be the same as or similar to communications component 106 of device 100. One, some, or all components of payment network subsystem 360 may be implemented using one or more processor components, which may be the same as or similar to processor component 102 of device 100, one or more memory components, which may be the same as or similar to a memory component of device 100, and/or one or more communications components, which may be the same as or similar to communications component 106 of device 100. One, some, or all components of issuing bank subsystem 370 may be implemented using one or more processor components, which may be the same as or similar to processor component 102 of device 100, one or more memory components, which may be the same as or similar to a memory component of device 100, and/or one or more communications components, which may be the same as or similar to communications component 106 of device 100. In the case of payment network subsystem 360 and issuing bank subsystem 370 being separate entities, payment network subsystem 360 may receive the authorization request of data 395 from acquiring bank subsystem 300 and may then forward the request to issuing bank subsystem 370 as data 495 (e.g., via a communication path 45 between payment network subsystem 360 and issuing bank subsystem 370). In the case of payment network subsystem 360 and issuing bank subsystem 370 being the same entity, acquiring bank subsystem 300 may submit the authorization request of data 395 directly to issuing bank subsystem 370. Furthermore, payment network subsystem 360 may respond to acquiring bank subsystem 300 on behalf of issuing bank subsystem 370 (e.g., according to conditions agreed upon between payment network subsystem 360 and issuing bank subsystem 370). By interfacing between acquiring bank subsystem 300 and issuing bank subsystem 370, payment network subsystem 360 may reduce the number of entities that each acquiring bank subsystem 300 and each issuing bank subsystem 370 may have to interact with directly. That is, to minimize direct integration points of financial institution subsystem 350, payment network subsystem 360 may act as an aggregator for various issuing banks 370 and/or various acquiring banks 300. Financial institution subsystem 350 may also include one or more acquiring banks, such as acquiring bank subsystem 300. For example, acquiring bank subsystem 300 may be the same entity as issuing bank subsystem 370.

When issuing bank subsystem 370 receives an authorization request (e.g., directly from acquiring bank subsystem 300 as data 395 or indirectly via payment network subsystem 360 as data 495), the payment information (e.g., commerce credential information of device 100) and the purchase amount included in the authorization request may be analyzed to determine if the account associated with the commerce credential has enough credit to cover the purchase amount. If sufficient funds are not present, issuing bank subsystem 370 may decline the requested transaction by transmitting a negative authorization response to acquiring bank subsystem 300. However, if sufficient funds are present, issuing bank subsystem 370 may approve the requested transaction by transmitting a positive authorization response to acquiring bank subsystem 300 and the financial transaction may be completed. Either type of authorization response may be provided by user financial subsystem 350 to acquiring bank subsystem 300 as authorization response data 399 (e.g., authorization response data 399 may be provided directly from issuing bank subsystem 370 to acquiring bank subsystem 300 via communication path 35, or authorization response data 399 may be provided from payment network subsystem 360 to acquiring bank subsystem 300 based on authorization response data 499 that may be provided to payment network subsystem 360 from issuing bank subsystem 370 via communication path 45). Appropriate authorization response data 299 may be generated and transmitted by acquiring bank subsystem 300 to merchant subsystem 200 (e.g., via communications path 25) based on authorization response data 399 so as to alert merchant subsystem 200 of the status of the financial transaction.

Alternatively or additionally, a credential of a secure element of device 100 provided as a commerce credential data communication to merchant subsystem 200 (e.g., as a contactless proximity-based communication 15 to merchant terminal 220) may be a cash card credential (e.g., a reloadable cash card credential, such as a transit card, a gift card, etc.), such that merchant subsystem 200 may need not leverage acquiring bank subsystem 300 and/or financial institution subsystem 350 for completing a financial transaction based on that commerce credential data communication. For example, after a user of electronic device 100 has chosen a product or service for purchase and has appropriately enabled a specific cash credential of device 100 to be used for payment, merchant subsystem 200 may receive an appropriate commerce credential data communication 15 indicative of commerce credential data for the specific cash credential. Based on such a received commerce credential data communication 15, merchant subsystem 200 may be configured to generate and transmit any suitable confirmation back to electronic device 100 indicative of such receipt, where device 100 may utilize such confirmation to confirm reduction of a balance associated with the cash credential on device 100 based on the purchase price of communication 15. That is, communication 15 based on a cash card credential may include all suitable information for merchant subsystem 200 alone and/or in combination with acquiring bank subsystem 300 to confirm and receive adequate financial payment for a financial transaction (e.g., without checking certain funds in financial institution subsystem 350), while a balance value associated with such a cash card credential may be reduced when such a communication 15 is sent and/or in response to receipt of a confirmation from merchant subsystem 200 based on receipt of such a sent communication 15. A cash card credential may enable offline transactions (e.g., when device 100 may not be communicatively coupled to other subsystems (e.g., via communications component 106)). Device 100 may be configured to communicate communication 15 with merchant subsystem 200, even when merchant subsystem 200 is "offline" (e.g., with respect to financial institution subsystem 350). Device 100 may be configured to communicate to merchant subsystem 200 what the balance of a cash card credential may be. Merchant subsystem 200 may be configured to essentially capture at least a portion of that balance from device 100 for an offline transaction. Later, when merchant subsystem 200 is back online, merchant subsystem 200 may be configured to settle the transaction. A cash card credential may be a stored value on secure element 145 and only on secure element 145.

In order for such financial transactions to occur within system 1, at least one commerce credential must first be securely provisioned on a secure element of electronic device 100 (e.g., as a portion of a credential SSD of NFC component 120). For example, such a commerce credential may be at least partially provisioned on a secure element of NFC component 120 of electronic device 100 directly from financial institution subsystem 350 (e.g., as credential pass data 595 via a communication path 75 between financial institution subsystem 350 and device 100, which may be passed to NFC component 120 via communications component 106). Additionally or alternatively, such a commerce credential may be at least partially provisioned on a secure element of NFC component 120 of electronic device 100 from financial institution subsystem 350 via commercial entity subsystem 400 (e.g., as credential pass data 595 via a communication path 55 between financial institution subsystem 350 and commercial entity subsystem 400, which may then be passed to device 100 as credential pass data 595 via a communication path 65 between a server of commercial entity subsystem 400 and communications component 106 of device 100, which may then be passed to NFC component 120 from communications component 106). Credential pass data 595 via path 75 and/or via path 65 may be provisioned on a secure element of device 100 as at least a portion or all of a credential SSD and may include a credential applet and/or a credential key, as described below in more detail. Financial institution subsystem 350 may also have access to a credential key for each credential it provisions (e.g., credential key 155a and/or 155b, as shown in FIG. 1A, for decrypting data that may encrypted by device 100 using its version of that credential key). Financial institution subsystem 350 may be responsible for management of credential keys 155, which may include the generation, exchange, storage, use, and/or replacement of such keys. Financial institution subsystem 350 may store its version of each credential key 155 in a secure element of financial institution subsystem 350.

The credential data that may be provisioned on device 100 may include all data necessary to make a payment with that credential, such as, for example, a primary account number ("PAN"), a card security code (e.g., a card verification code ("CVV")), expiration date, name associated with the credential, and/or the like. A "virtual" credential or virtual PAN or device PAN ("D-PAN") may be provisioned on device 100 rather than the user's "actual" credential or actual PAN or finding PAN ("F-PAN"). For example, once it is determined that a credential is to be provisioned on device 100, it may be requested (e.g., by financial institution subsystem 350, by commercial entity subsystem 400, by server 310, and/or by a user of device 100) that a virtual credential be generated, linked to the actual credential, and provisioned on device 100 instead of the actual credential. Such creation and linking of a virtual credential with an actual credential may be performed by any suitable component of financial institution subsystem 350. For example, a payment network subsystem 360 (e.g., a particular payment network subsystem 360 that may be associated with the brand of the actual credential) may define and store a virtual-linking table 352 (e.g., as shown in FIG. 1A) that may create associations between the actual credential and a virtual credential, such that anytime a virtual credential is utilized by device 100 for a financial transaction with merchant subsystem 200 (e.g., after being provisioned on device 100), payment network subsystem 360 may receive an authorization request indicative of that virtual credential (e.g., as data 395 of FIG. 1A) and may conduct an analysis of that authorization request in light of the actual credential associated with the virtual credential as determined by table 352. By provisioning a virtual credential on device 100 rather than an actual credential, financial institution subsystem 350 may be configured to limit the fraudulent activity that may result when the virtual credential is intercepted by an unauthorized user, as payment network subsystem 360 may only be configured to utilize table 352 for linking the virtual credential to the actual credential during certain transactions.

Commercial entity subsystem 400 may be provided as an intermediary between electronic device 100 and financial institution subsystem 350, where commercial entity subsystem 400 may be configured to provide a new layer of security and/or to provide a more seamless user experience when a credential is being provisioned or otherwise managed on a secure element of device 100. Commercial entity subsystem 400 may be provided by a specific commercial entity that may offer various services to a user of device 100, for example, via user-specific log-in information to a user-specific account with that commercial entity (e.g., via user-specific identification and password combinations). As just one example, commercial entity subsystem 400 may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.), and which may also be a provider, manufacturer, and/or developer of device 100 itself (e.g., when device 100 is an iPod™, iPad™ iPhone™, or the like). The commercial entity that may provide commercial entity subsystem 400 (e.g., Apple Inc.) may be distinct and independent from any financial institution of financial institution subsystem 350. For example, the commercial entity that may provide commercial entity subsystem 400 may be distinct and independent from any entity that may furnish or otherwise mange bank server 310, any entity that may furnish or otherwise manage third party application 113, any entity that may furnish or otherwise mange payment network subsystem 360, and/or any entity that may furnish or otherwise mange issuing bank subsystem 370, which may furnish and/or manage any credit card or other commerce credential provisioned on user device 100. Additionally or alternatively, the commercial entity that may provide commercial entity subsystem 400 (e.g., Apple Inc.) may be distinct and independent from any merchant of merchant subsystem 200. For example, the commercial entity that may provide commercial entity subsystem 400 may be distinct and independent from any merchant of merchant subsystem 200 that may provide terminal 220 or any other aspect of merchant subsystem 200. Such a commercial entity may leverage its potential ability to configure or control various components of device 100 (e.g., software and/or hardware components of device 100 when that commercial entity at least partially produces or manages device 100) in order to provide a more seamless user experience for a user of device 100 when he or she wants to provision or otherwise manage a credential offered by financial institution subsystem 350 on user device 100. For example, in some embodiments, device 100 may be configured to communicate with commercial entity subsystem 400 seamlessly and transparently to a user of device 100 (e.g., via communications path 65) for sharing or receiving certain data that may enable a higher level of security (e.g., during provisioning or other suitable management of one or more credentials on a secure element of device 100).

As mentioned, in addition to at least one commerce credential being provisioned on a secure element of electronic device 100 (e.g., as a portion of an SSD credential of NFC component 120), an issuer security domain ("ISD") may also be provisioned on a secure element of device 100 in order to more securely enable device 100 to conduct a financial transaction with merchant subsystem 200. For example, an ISD with an ISD key may be at least partially provisioned on a secure element of NFC component 120 of electronic device 100. As shown in FIG. 1A, commercial entity subsystem 400 may also have access to ISD key 156*k* (e.g., for decrypting data encrypted by device 100 using its ISD key). Commercial entity subsystem 400 may be responsible for management of ISD key 156*k*, which may include the generation, exchange, storage, use, and/or replacement of such a key. Commercial entity subsystem 400 may store its version of ISD key 156*k* in a secure element of commercial entity subsystem 400. An ISD key of an ISD of NFC component 120 may be leveraged to provide increased encryption to financial transaction data that may be communicated outside of the secure element of device 100.

As shown in FIG. 1A, system 1 may include a bank server 310 that may manage or otherwise at least partially control content communicated with device 100 via an online resource, such as third party application 113. For example, in some embodiments, as shown, bank server 310 may be provided by financial institution subsystem 350 of FIG. 1A, although, in other embodiments, bank server 310 may be provided by any other suitable subsystem or entity of system 1 and/or may be an independent entity in an independent subsystem of system 1. Bank server 310 may include any suitable component or subsystem that may be configured to communicate any suitable online-based communication data (e.g., data 654, 672, 676, and/or 692) with communications component 106 of electronic device 100 (e.g., via communications path 75). Such online-based communication may be configured to communicate online resource data and/or any suitable credential management data (e.g., information suitable to enable or otherwise facilitate the provisioning or other suitable management (e.g., reloading) of one or more credentials on the secure element of NFC component 120) between device 100 and server 310 via any suitable communications protocol supported by communications component 106 of device 100 (e.g., Wi-Fi, Bluetooth™, cellular, wired network protocols, etc.). Such online-based communication may be provided within any suitable online-context, such as when a user of device 100 is communicating with server 310 to conduct any suitable business through user interaction with a third party application 113 (e.g., a native app or a hybrid app) running on device 100 that may be managed by server 310 and/or through user interaction with an internet application 113 or web browser (e.g., Safari™ by Apple Inc.) running on device 100 that may be pointed to a uniform resource locator ("URL") whose target or web resource (e.g., web app or web page) may be managed by server 310. Accordingly, it is noted that such online-based communication between server 310 and electronic device 100 may occur wirelessly and/or via wired paths (e.g., over the internet). Server 310 may be provided by a bank (e.g., a bank of issuing bank subsystem 370) and/or by a network (e.g., a network of payment network subsystem 360) of financial institution subsystem 350 (e.g., as a webserver to host website data and/or to manage third party application data for a bank application 113). Although not shown, server 310 (e.g., of financial institution subsystem 350) may also include or be associated with or work in conjunction with a processor component that may be the same as or similar to a processor component 102 of electronic device 100, a communications component that may be the same as or similar to a communications component 106 of electronic device 100, an I/O interface that may be the same as or similar to an I/O interface of electronic device 100, a bus that may be the same as or similar to a bus of electronic device 100, a memory component that may be the same as or similar to a memory component of electronic device 100, and/or a power supply component that may be the same as or similar to a power supply component of electronic device 100.

Although server 310 may be referred to herein as a "bank" server, it is understood that server 310 may be associated with any suitable entity or institution that may manage or at least partially control an online resource (e.g., a third party application or website) that may facilitate the management of credentials on an electronic device when that online resource is accessed by a user of the electronic device. Additionally or alternatively, although online resource or application 113 may be referred to herein as a "bank" application or "bank app," it is understood that such an online resource may be any suitable third party application or website that may be managed or at least partially controlled by any suitable entity or institution that may facilitate the management of credentials on an electronic device when that online resource is accessed by a user of the electronic device. Moreover, application 113 may be used herein to refer to any suitable online resource that may be managed or at least partially controlled by server 310 and may include any suitable application (e.g., a native app or a hybrid app) running on device 100 that may be managed by server 310 and/or any suitable web browser running on device 100 that may be pointed to a URL or any other suitable address whose target or web resource (e.g., web app or web page) may be managed by server 310.

Moreover, in addition to at least one credential SSD and/or ISD being provisioned on a secure element of electronic device 100, at least one third party application (e.g., application 113) may be accessed by device 100 in order to enable a user to access an online resource (e.g., for enabling online-based communication between device 100 and server 310). First, such an application 113 may be approved or otherwise enabled by commercial entity subsystem 400 before application 113 may be accessible by device 100. For example, an application store 420 of commercial entity subsystem 400 (e.g., the Apple App Store™) may receive at least some date representative of application 113 from server 310 (e.g., via communications path 55). Moreover, in some embodiments, commercial entity subsystem 400 and/or server 310 may generate or otherwise assign one or more application identifiers ("App IDs") to any application 113 managed by server 310 that may be utilized by electronic device 100 for online communication with server 310. Additionally or alternatively, commercial entity subsystem 400 and/or server 310 may generate or otherwise assign one or more application identifiers ("App IDs") to any website (e.g., one or more URLs) managed by server 310 that may be accessed by electronic device 100 for online communication with server 310. Additionally or alternatively, commercial entity subsystem 400 and/or server 310 may generate or otherwise assign one or more appropriate application identifiers ("App IDs") to any commerce credential provisioned on the secure element of electronic device 100. In some embodiments, such an App ID may be specifically associated with a specific application 113 and/or website, while, in other embodiments, an App ID may be specifically associated with a managing entity of server 310 such that a specific App ID may be associated with multiple third party applications or websites that may be operated by the same server 310. By assigning at least one App ID to at least one credential provisioned on device 100 and by assigning at least one App ID to at least one third party application or website managed by server 310, a layer of security may be provided for enabling management of one or more credentials on device 100 using an online resource of server 310.

Description of FIG. 2

Referring now to FIG. 2, FIG. 2 shows a more detailed view of electronic device 100 of system 1 described above with respect to FIGS. 1 and 1A. As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2. One or more input components 110 may be provided to permit a user to interact or interface with device 100 and/or one or more output components 112 may be provided to present information (e.g., graphical, audible, and/or tactile information) to a user of device 100. It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen. Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 1A, processor 102 may be used to run one or more applications, such as an application 103 and/or an application 113. As one example, application 103 may be an operating system application while application 113 may be a third party application (e.g., an application associated with a bank of financial institution subsystem 350).

NFC component 120 may be any suitable proximity-based communication mechanism that may enable any suitable contactless proximity-based transactions or communications 15 between electronic device 100 and merchant subsystem 200 (e.g., a merchant payment terminal 220 of merchant subsystem 200). NFC component 120 may include any suitable modules for enabling contactless proximity-based communication 15 between electronic device 100 and subsystem 200. As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to terminal 220 as part of a contactless proximity-based or NFC communication 15. Additionally or alternatively, NFC data module 132 may be configured to contain, route, or otherwise receive any suitable data that may be received by NFC component 120 from terminal 220 as part of a contactless proximity-based communication 15. NFC controller module 140 may include at least one NFC processor module 142. NFC processor module 142 may operate in conjunction with NFC device module 130 to enable, activate, allow, and/or otherwise control NFC component 120 for communicating NFC communication 15 between electronic device 100 and terminal 220. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communication 15 between electronic device 100 and merchant subsystem 200. NFC memory module 150 may be tamper resistant and may provide at least a portion of a secure element 145 (see, e.g., FIG. 3). For example, such a secure element 145 may be configured to provide a tamper-resistant platform (e.g., as a single or multiple chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of financial institution subsystem and/or an industry standard, such as GlobalPlatform).

As shown in FIG. 2, for example, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., financial institution subsystem 350) may store keys and/or other suitable information for creating or otherwise provisioning one or more credentials (e.g., credentials associated with various credit cards, bank cards, gift cards, access cards, transit passes, etc.) on electronic device 100 (e.g., via communications component 106), for credential content management, and/or security domain management. A specific supplemental security domain ("SSD") 154 (e.g., one of SSDs 154a and 154b) may be associated with a particular TSM and at least one specific commerce credential (e.g., a specific credit card credential or a specific public transit card credential) that may provide specific privileges or payment rights to electronic device 100. Each SSD 154 may have its own manager key and may include or be associated with at least one of its own credential applications or credential applets (e.g., a Java card applet instances) that may be associated with a particular commerce credential (e.g., a respective one of credential applets 153a and 153b), where a credential applet may have its own access key (e.g., access key 155a for credential applet 153a, and access key 155b for credential applet 153b) and where a credential applet may need to be activated to enable its associated commerce credential for use by NFC device module 130 as an NFC communication 15 between electronic device 100 and merchant subsystem 200. For example, an applet 153 of an SSD 154 may be an application that may run on a secure element 145 of NFC component 120 (e.g., in a GlobalPlatform environment).

A key 155 of an SSD 154 may be a piece of information that can determine a functional output of a cryptographic algorithm or cipher. For example, in encryption, a key may specify a particular transformation of plaintext into ciphertext, or vice versa during decryption. Keys may also be used in other cryptographic algorithms, such as digital signature schemes and message authentication codes. Each key and applet may be loaded on the secure element of device 100 by a TSM or an authorized agent or pre-loaded on the secure element when first provided on device 100. While credential SSD 154a may be associated with a particular card credential, that particular credential may only be communicated as a commerce credential data communication to merchant subsystem 200 (e.g., as a contactless proximity-based communication 15 to merchant terminal 220) from a secure element of device 100 (e.g., from NFC component 120) for a financial transaction when applet 153a of that credential SSD 154a has been enabled or otherwise activated or unlocked for such use.

Security features may be provided for enabling use of NFC component 120 that may be particularly useful when transmitting confidential payment information, such as credential card information, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area. In certain embodiments, some or all of the security features may be stored within NFC memory module 150. Further, security information, such as an authentication key, for communicating commerce credential data with merchant subsystem 200 may be stored within NFC memory module 150. In certain embodiments, NFC memory module 150 may include a microcontroller embedded within electronic device 100. As just one example, a component or any suitable portion of the secure element may be configured to determine intent and local authentication of a user of device 100 (e.g., via one or more input components 110, such as a biometric input component) and, in response to such a determination, may be configured to enable a particular SSD for conducting a payment transaction (e.g., with a credential of credential SSD 154a).

Description of FIG. 3

Referring now to FIG. 3, FIG. 3 shows another detailed view of a portion of electronic device 100 of system 1 described above with respect to FIGS. 1-2. As shown in FIG. 3, for example, a secure element 145 of NFC component 120 may include a first SSD 154a, which may include or be associated with applet 153a, which may include an access key 155a and/or a credential key 155a', and a second SSD 154b, which may include or be associated with applet 153b, which may include an access key 155b and/or a credential key 155b', where each one of access keys 155a and 155b may also be known to a commercial entity subsystem (e.g., commercial entity subsystem 400, as shown in FIG. 1A), and/or where each one of credential keys 155a' and 155b' may also be known to a financial institution subsystem (e.g., financial institution subsystem 350, as shown in FIG. 1A). Each SSD 154 may have its own manager key 155 (e.g., a respective one of keys 155ak and 155bk) that may need to be activated to enable a function of that SSD 154 for use by NFC device module 130. Additionally or alternatively, each SSD 154 may include and/or be associated with at least one of its own credential applications or credential applets (e.g., a Java card applet instances) associated with a particular commerce credential (e.g., credential applet 153a of SSD 154a may be associated with a first commerce credential, and/or credential applet 153b of SSD 154b may be associated with a second commerce credential), where a credential applet may need to be activated to enable its associated commerce credential for use by NFC device module 130 as an NFC communication 15 between electronic device 100 and merchant subsystem 200. In some embodiments, a credential key of a credential applet (e.g., credential key 155a' for credential applet 153a and/or credential key 155b' for credential applet 153b) may be generated by financial institution subsystem 350 that may be responsible for such a credential and may be accessible by that financial institution subsystem 350 (e.g., as shown in FIG. 1A) for enabling secure transmission of that credential applet between secure element 145 and financial institution subsystem 350. Additionally or alternatively, an access key of a credential applet (e.g., access key 155a for credential applet 153a and/or access key 155b for credential applet 153b) may be generated by commercial entity subsystem 400 and may be accessible by commercial entity subsystem 400 (e.g., as shown in FIG. 1A) for enabling secure transmission of that credential applet between secure element 145 and commercial entity subsystem 400.

Additionally or alternatively, as shown in FIG. 3, secure element 145 may include ISD 152, which may include an ISD key 156k that may also be known to a trusted service manager associated with that security domain (e.g., commercial entity subsystem 400, as shown in FIG. 1A). ISD key 156k may be leveraged by commercial entity subsystem 400 and electronic device 100 similarly to and/or instead of an access key (e.g., access key 155a) for enabling secure transmissions between commercial entity subsystem 400 and secure element 145 of electronic device 100. Moreover, as shown in FIG. 3, each SSD 154 and bank application 113 may each be associated with at least one App ID. For example, SSD 154a and/or its associated credential applet 153a may include and/or be associated with an App ID information 159a that may associate SSD 154a and/or its associated credential applet 153a with at least one particular App ID, SSD 154b and/or its associated credential applet 153b may include and/or be associated with an App ID information 159b that may associate SSD 154b and/or its associated credential applet 153b with at least one particular App ID, and/or bank application 113 may include and/or be associated with App ID information 159c that may associate bank application 113 with at least one particular App ID. Each App ID information 159 (e.g., 159a-159c) may be any suitable type of information that may be associated with a credential or application in any suitable way. Moreover, as shown in FIG. 3, and as described below in more detail, various data may be communicated between processor 102 and secure element 145. For example, processor 102 of device 100 may be configured to run a device application 103 that may communicate information with a bank application 113 of processor 102 as well as secure element 145, an I/O component 114a (e.g., for receiving I/O input data 115i and/or for transmitting I/O output data 115o), and/or communications component 106.

Additionally or alternatively, as shown in FIG. 3, secure element 145 may include a controlling authority security domain ("CASD") 158, which may be a special purpose security domain that may be configured to serve as a third-party on-element root of trust. An associated application of CASD 158 may be configured to provide on-element confidential key generation as a global service to other applications and/or to a specific management layer (e.g., a GlobalPlatform management layer). Confidential key material that may be used within CASD 158 may be configured such that it cannot be inspected or modified by any entity, including an issuer of secure element 145. CASD 158 may be configured to include and/or may be configured to generate and/or otherwise include CASD access kit 158k (e.g., a CASD private key ("CASD-SK"), a CASD public key ("CASD-PK"), a CASD certificate ("CASD-Cert."), and/or a CASD-signing module). For example, CASD 158 may be configured to sign and/or encrypt certain data on secure element 145 (e.g., using CASD access kit 158k) before providing such data to another portion of device 100 (e.g., communications component 106 for sharing with other subsystems of system 1). As an example, CASD 158 may be configured to sign any data that is provided by secure element 145 such that other subsystems may be able to confirm that such signed data was signed by secure element 145.

Additionally or alternatively, as shown in FIG. 3, secure element 145 may include a contactless registry services ("CRS") applet or application 151 that may be configured to provide local functionality to electronic device 100 for identifying and/or modifying the App ID, life cycle state, and/or activation state (e.g., activated, deactivated, locked, enabled, disabled, etc.) of certain security domain elements and sharing certain output information related to that information with another portion of device 100 (e.g., a device application 103 of device 100 off of the secure element). For example, a CRS application may include a CRS list that may maintain a list of the current state of each security domain element on secure element 145 (e.g., state of applet 153a of SSD 154a, and/or state of applet 153b of SSD 154b), where the CRS application may be configured to share the state of one or more security domain elements of secure element 145 with an application of device 100 (e.g., with device application 103 that may be running as a background process inside an operating system application but that may not be under the control of an interactive user of device 100), which in turn may provide certain state information to a user of device 100 as output information 115o via I/O interface 114a and/or to a user interface ("UI") application or other suitable application that may be running on device 100 (e.g., bank application 113, as described below), which may enable a user to enact a change in state of a security domain element (e.g., to update such a CRS list and a state of a security domain element, such as for enabling a commerce credential of a specific credential applet for use in an NFC communication 15). A current balance of a cash card credential may be considered a "state" that may be polled/queried (e.g., by an application of device 100) and/or may be obtained via a formal notification mechanism (e.g., via a layer of an operating system of device 100). Additionally or alternatively, CRS 151 may include a CRS access kit 151k that may also be known to a trusted service manager associated with CRS 151 (e.g., commercial entity subsystem 400, as shown in FIG. 1A). CRS access kit 151k may be leveraged by commercial entity subsystem 400 and electronic device 100 similarly to and/or instead of an access key (e.g., access key 155a) for enabling secure transmissions between commercial entity subsystem 400 and secure element 145 of electronic device 100.

A CRS application may include a CRS list that may maintain a list of the current App ID or App IDs that may be associated with each security domain element on secure element 145 (e.g., based on App ID information 159a of SSD 154a and/or App ID information 159b of SSD 154b), where the CRS application may be configured to share the App ID(s) of one or more security domain elements of secure element 145 with an application of device 100 (e.g., with device application 103), which in turn may provide certain App ID information and/or other information associated with SSDs associated with a particular App ID to a user of device 100 as output information 115o via I/O interface 114a and/or via a user interface ("UI") application or other suitable application that may be running on device 100 (e.g., bank application 113, as described below). For example, device application 103 may be configured to receive such a list of the state and the App ID(s) associated with each SSD of secure element 145 and may share the state and/or any other suitable information for any SSDs that share at least one App ID with an App ID associated with an online resource (e.g., bank application 113) that may be running on device 100. Therefore, in response to device 100 identifying at least one SSD 154 of secure element 145 that may be associated with an App ID that may also be associated with an online resource running on device 100 (e.g., by comparing App ID information 159*c* with App ID information 159*a* and 159*b*), device 100 may be configured to share the state information and/or any other suitable identifying information for each identified SSD 154 with that online resource (e.g., bank application 113), such as for enabling management of each identified SSD 154 using that online resource, as described below in more detail.

Description of FIG. 4

As shown in FIG. 4, and as described below in more detail, a specific example of electronic device 100 may be a handheld electronic device, such as an iPhone™, where housing 101 may allow access to various input components 110*a*-110*i*, various output components 112*a*-112*c*, and various I/O components 114*a*-114*d* through which device 100 and a user and/or an ambient environment may interface with each other. For example, a touch screen I/O component 114*a* may include a display output component 112*a* and an associated touch input component 110*f*, where display output component 112*a* may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112*a*. For example, as shown in FIG. 4, GUI 180 may be configured to display a first screen 190 with one or more graphical elements or icons 182 of GUI 180. When a specific icon 182 is selected, device 100 may be configured to open a new application associated with that icon 182 and display a corresponding screen of GUI 180 associated with that application. For example, when the specific icon 182 labeled with a "Bank App" textual indicator 181 (i.e., specific icon 183) is selected, device 100 may launch or otherwise access a specific third party bank application and may display screens of a specific user interface that may include one or more tools or features for interacting with device 100 in a specific manner (see, e.g., FIGS. 9A-9D for specific examples of such displays of GUI 180 during use of a bank application (e.g., application 113) that may be used by a user of device 100 for provisioning or otherwise managing credentials of secure element 145 (e.g., a credential of SSD 154*b*)). For each application, screens may be displayed on display output component 112*a* and may include various user interface elements. Additionally or alternatively, for each application, various other types of non-visual information may be provided to a user via various other output components 112 of device 100.

Description of FIG. 5, FIG. 6, and FIGS. 9A-9D

Figure 5:
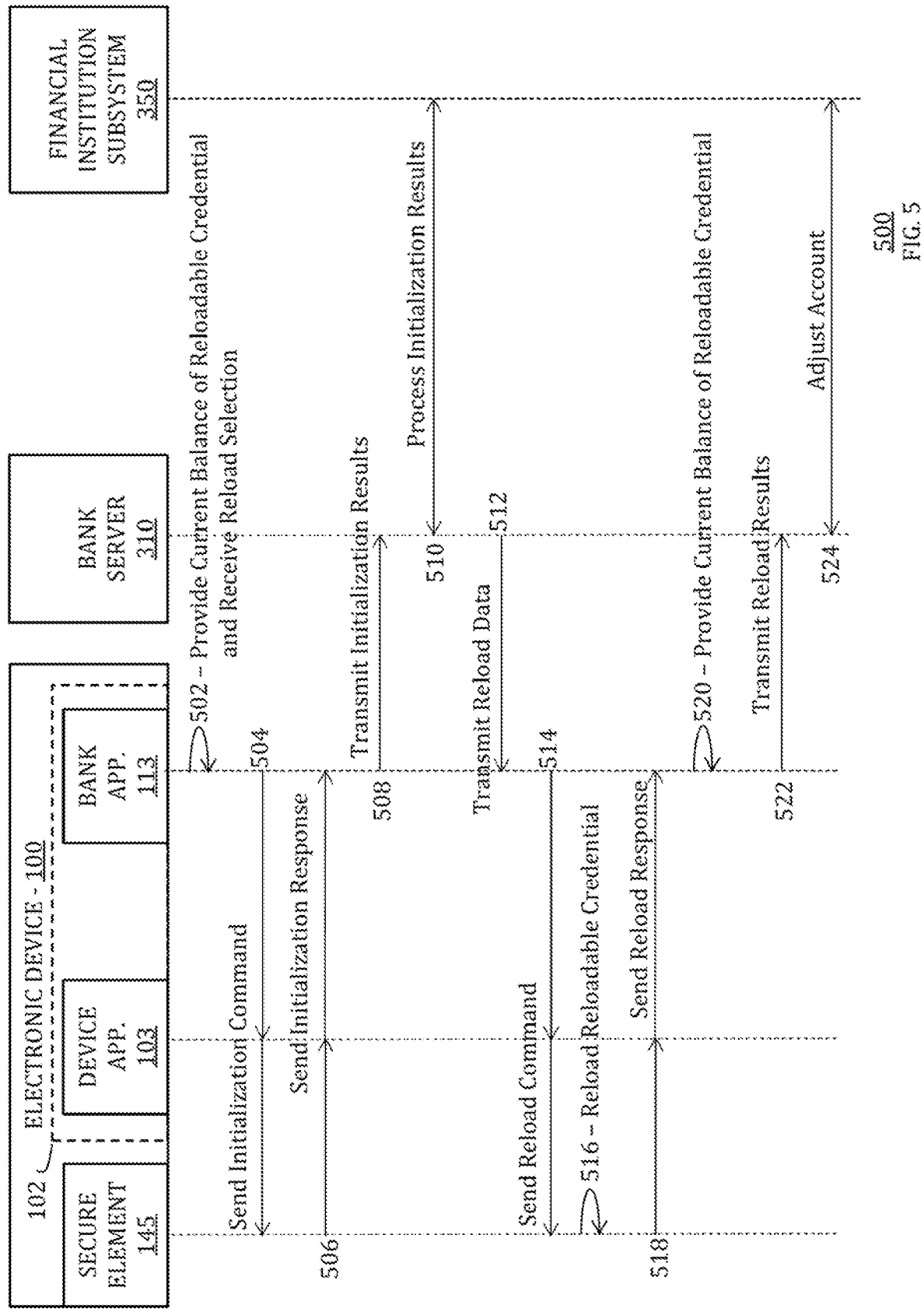
FIGS. 5-8 are flowcharts of illustrative processes for using an online resource to manage reloadable credentials on an electronic device.
Figure 6:
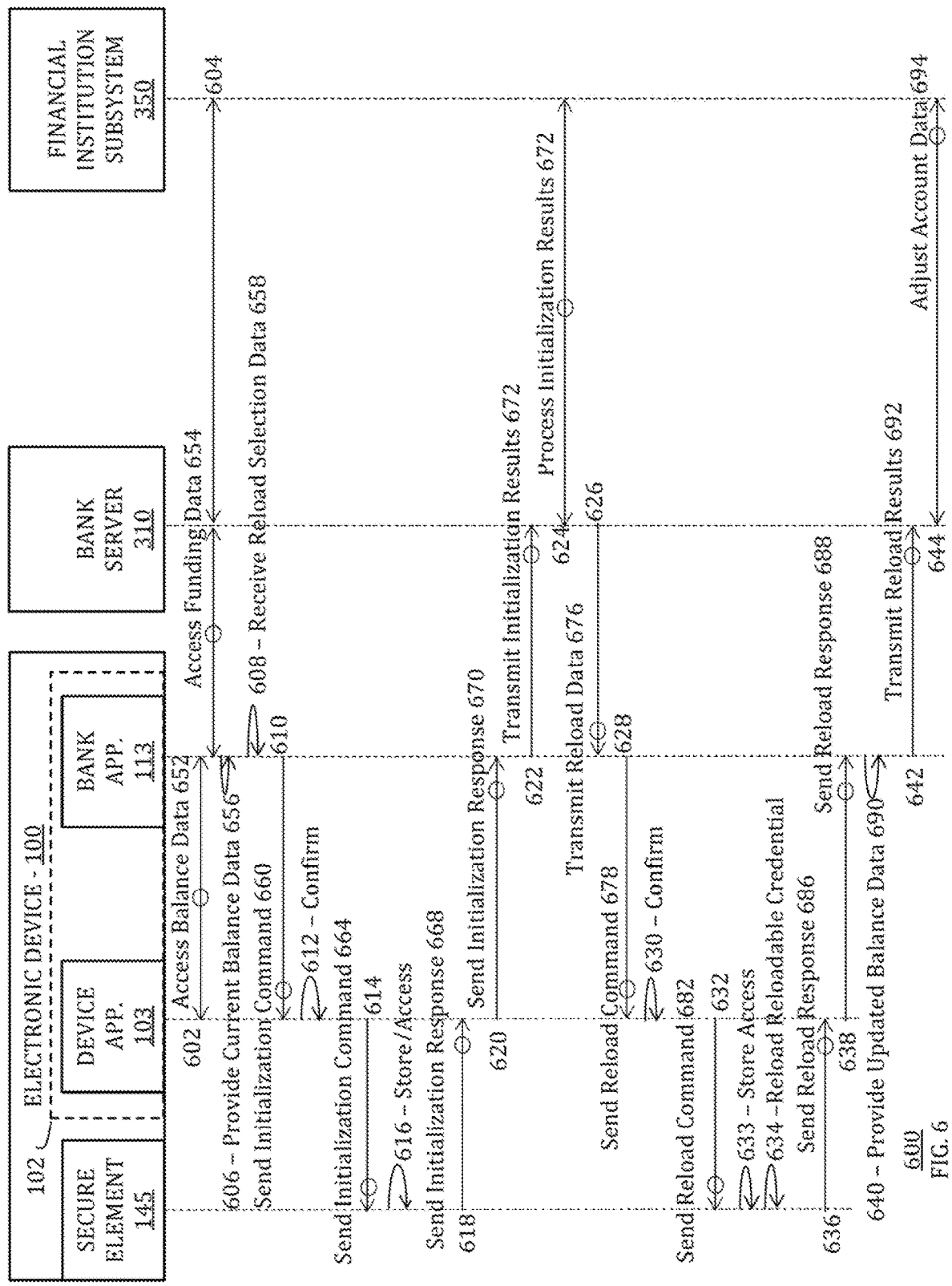

To facilitate the following discussion regarding the operation of system 1 for managing reloadable credentials on an electronic device using an online resource, reference is made to one or more processes of one or more flowcharts of FIGS. 5 and 6, to various components of system 1 of the schematic diagrams of FIGS. 1-4, and to front views of screens 190-190*d* that may be representative of a graphical user interface of electronic device 100 during such credential management (e.g., as shown in FIGS. 4 and 9A-9D). The operation described may be achieved with a wide variety of graphical elements and visual schemes. Therefore, the embodiments of FIGS. 4 and 9A-9D are not intended to be limited to the precise user interface conventions adopted herein. Rather, embodiments may include a wide variety of user interface styles.

FIG. 5 is a flowchart of an illustrative process 500 for managing reloadable credentials on an electronic device using an online resource. Process 500 is shown being implemented by electronic device 100 (e.g., secure element 145, device app 103, and bank app 113), bank server 310, and financial institution subsystem 350. However, it is to be understood that process 500 may be implemented using any other suitable components or subsystems. Process 500 may provide a seamless user experience for managing reloadable credentials on secure element 145 of electronic device 100 using an online resource (e.g., bank application 113). Process 500 may begin at step 502, where a current balance of at least one reloadable credential provisioned on secure element 145 of device 100 may be provided to a user and a selection to reload that credential may be received (e.g., via device application 103). However, prior to step 502 of process 500, bank application 113 may first be loaded onto device 100 (e.g., via application store 420 of FIG. 1A), launched on device 100 (e.g., through user selection of the specific icon 182 labeled with a "Bank App" textual indicator 181 (i.e., specific icon 183) of FIG. 4), and/or used to appropriately authenticate a user of device 100 with bank application 113. For example, a user may interface with bank application 113 running on device 100 (e.g., via I/O interface 114*a*) for authenticating itself with respect to an account managed by or otherwise under the control of server 310. In some embodiments, server 310 and, thus, application 113 may be managed and/or otherwise at least partially under the control of a bank or other suitable entity of payment network 360 and/or issuing bank 370 of financial institution subsystem 350 or any other subsystem that may have control over a reloadable credential of device 100 (e.g., application 113 may be a banking application for China UnionPay ("CUP"), Bank of America, or the like, with which a user of device 100 may have an account that may be associated with one or more payment credentials (e.g., credit cards, debit cards, reloadable cash cards, etc.)). The target for a cash card credential may be a pass (e.g., a pass backed by an SE applet). Any suitable application 113 may be configured to know about that cash card credential pass such that the pass may accept funds from the application 113. In some embodiments, an application 113 may share a common or related App ID with a cash card credential pass' associated SSD/applet in order to fund or otherwise access the cash card credential for funding and/or reduction purposes.

Through user interaction with such an online resource bank application 113 on device 100, a user may authenticate itself in order to view certain account data of that user's account with an entity managing bank server 310. Application 113 and server 310 may be configured in any suitable way to appropriately authenticate a user of device 100 with an account, such as through user PIN-entry, user biometric data entry, username/password entry, user-question answering entry, and the like. In response to application 113 receiving user authentication information at device 100 and in response to such authentication information being communicated from device 100 to server 310 (e.g., via communications path 75 of FIG. 1A), server 310 may analyze that authentication information and return appropriate user account data to device 100 prior to step 502 of process 500 if that authentication information is determined to be appropriate by server 310. Moreover, bank application 113 and/or an authenticated account of bank server 310 via bank application 113 may be associated with a reloadable credential provisioned on secure element 145. For example, prior to step 502, electronic device 100 may utilize any data associated with online resource 113 and/or associated with any account data received by online resource 113 from bank server 310 in order to access any appropriate data related to the secure element. For example, electronic device 100 (e.g., device application 103) may identify at least one, some, or all App IDs that may be associated with an online resource currently being used by device 100 (e.g., App ID 159*c* of bank application 113) and then may attempt to access secure element data indicative of at least one, some, or all credentials on secure element 145 that may be associated with one or more of the identified App IDs of the online resource. In some embodiments, device 100 may be configured to determine that App ID 159*c* is associated with currently running application 113 based on any suitable account data that may be received by device 100 (e.g., in response to a user of device 100 authenticating itself with server 310 via application 113). Alternatively or additionally, device 100 may be configured to determine that App ID 159*c* is associated with currently running application 113 based on any suitable information that may be locally stored on device 100 with respect to application 113 and/or that may be inherently associated with application 113 regardless of whether or not application 113 has received account data in response to user authentication. In response to identifying that App ID 159*c* is associated with currently running application 113, device 100 (e.g., device application 103) may be configured to communicate with secure element 145 or enact any other suitable procedure in order to access any suitable data with respect to any SSD 154 of secure element 145 that may be associated with App ID 159*c*.

Bank application 113 may be configured to access such secure element data by communicating with device application 103 (e.g., an operating system application and/or a software developer kit ("SDK")) that may be available to processor 102 of device 100 and that may be configured to communicate with the bank online resource 113 via any suitable techniques (e.g., via one or more application programming interfaces ("APIs")). Device application 103 may be configured to access various types of information available to device 100 (e.g., from memory 104 and/or secure element 145). For example, device application 103 may be configured to access suitable information for every SSD 154 of secure element 145 (e.g., credential description information (e.g., partial PAN information), App ID information, state information, and the like (e.g., from a CRS list of secure element 145, for example, as a Passbook application)), and device application 103 may then be configured to filter such information so that only such information for each SSD 154 that is associated with an App ID that is also associated with bank application 113 may be provided by device application 103 to bank application 113. Alternatively, device application 103 may be configured to access suitable information only for each SSD 154 of secure element 145 (e.g., from a CRS list of secure element 145) that may be associated with an App ID that is also associated with bank application 113, and device application 103 may be configured to provide only that accessed information to bank application 113. For example, if App ID 159*c* of bank application 113 matches or is otherwise deemed associated with App ID 159*a* of SSD 154*a*, information regarding the credential of SSD 154*a* (e.g., the current value of reloadable balance 161*a* of reloadable credential applet 153*a* of SSD 154*a*) may be provided by device application 103 to bank application 113. Alternatively or additionally, if App ID 159*c* of bank application 113 matches or is otherwise deemed associated with App ID 159*b* of SSD 154*b*, information regarding the credential of SSD 154*b* (e.g., the current value of a reloadable balance (not shown) of reloadable credential applet 153*b* of SSD 154*b*) may be provided by device application 103 to bank application 113. For example, as shown by screen 190*a* of FIG. 9A, device 100 may be configured to provide a listing of at least one reloadable credential provisioned on secure element 145 that may be accessible by bank application 113, a current balance of each reloadable credential, and/or at least one selectable user option for reloading or otherwise adjusting a balance of a particular reloadable credential. Specifically, screen 190*a* may include a listing of reloadable credential "A" of applet 153*a* and reloadable credential "B" of applet 153*b*, as well as a listing of the status (e.g., current balance) of each reloadable credential accessible to bank application 113, as well as a listing of at least one management option for each account credential (e.g., "reload" management option 901*a* for facilitating the reloading (e.g., adjusting) of the current balance (e.g., "Value D") of reloadable credential A of SSD 154*a* of secure element 145, and/or "reload" management option 901*b* for facilitating the reloading (e.g., adjusting) of the current balance (e.g., "Value E") of reloadable credential B of SSD 154*b* of secure element 145).

By providing a current value of a reloadable balance 161*a* of reloadable credential applet 153*a* of SSD 154*a* at step 502 (e.g., as shown by screen 190*a* of FIG. 9A), bank application 113 may be configured to provide a user with the ability to choose to add additional funds to that reloadable credential for increasing the value of balance 161*a*. For example, also at step 502, in response to providing the current value of at least a reloadable balance 161*a* of reloadable credential applet 153*a* of SSD 154*a*, bank application 113 may be configured to provide a user with the ability to choose to reload funds for that credential applet and then receive such a user selection. In response to providing UI screen 190*a* of FIG. 9A at step 502, a user may interact with device 100 (e.g., with I/O interface 114*a*) in one of many possible ways (e.g., with a user input selection of one of options 901*a* and 901*b* as I/O input data 115*i* of FIG. 3) for managing a reloadable credential on secure element 145. For example, when a user may choose option 901*a* of FIG. 9A at step 502, bank application 113 may provide a user with at least one user-selectable option for at least one reload source with which the current balance of reloadable credential A of SSD 154*a* may be reloaded, for example, by providing screen 190*b* of FIG. 9B that may include a listing at least one reload source option (e.g., source G of option 903*a* and source H of option 903*b*) for selecting a particular reload source for use in reloading reloadable credential A. Such a reload source may be any suitable funding source associated with device 100 (e.g., associated with a user of device 100, such as through authentication with bank server 310 via bank application 113), which may include any suitable bank account managed by any suitable subsystem of financial institution subsystem 350. Alternatively, a reload source could be another cash card credential or any other suitable credential on secure element 145 that may be configured to fund a reload of a particular cash card credential. Moreover, in response to providing UI screen 190*b* of FIG. 9B at step 502, a user may interact with device 100 (e.g., with I/O interface 114*a*) in one of many possible ways (e.g., with a user input selection of one of options 903*a* and 903*b* as I/O input data 115*i* of FIG. 3) for managing a reloadable credential on secure element 145. For example, when a user may choose reload source G of option 903*a* of FIG. 9B at step 502, bank application 113 may provide a user with at least one user-selectable option for entering the reload amount with which the current balance of reloadable credential A is to be reloaded, for example, by providing screen 190*c* of FIG. 9C that may include reload amount entry option 905*a* for enabling user selection of a particular reload amount for use in reloading reloadable credential A. Such an amount may be any suitable value that may be supported by the funds available to the selected reload source (e.g., source G). In some embodiments, the amount may be capped at any suitable amount (e.g., at 1,000 renminbi ("RMB") in the People's Republic of China). In some embodiments, the amount may be either a positive number (e.g., for increasing the current balance of funds available to reloadable credential A by moving funds from source G to credential A) or a negative number (e.g., for decreasing the current balance of funds available to reloadable credential A by moving funds from credential A to source G). Moreover, in response to providing UI screen 190*c* of FIG. 9C and receiving entry of a reload amount at option 905*a* at step 502, a user may interact with device 100 (e.g., with I/O interface 114*a*) in one of many possible ways for initiating the reloading of a reloadable credential on secure element 145. For example, once a user has entered a particular reload amount with option 905*a* of FIG. 9C at step 502, bank application 113 may provide a user with at least one user-selectable option for initiating the reloading of that amount with reloadable credential A, for example, by providing reload option 905*b* of FIG. 9C for enabling user reload selection of the particular reload amount of option 905*a* for use in reloading reloadable credential A. Therefore, following the particular example, user selection of reload option 905*b* of FIG. 9C at step 502 may initiate the reloading of the particular reload amount of option 905*a* to reloadable credential A with reload source G.

In response to receiving such a reload selection (e.g., selection of particular reloadable credential A of applet 153*a*) at step 502, step 504 of process 500 may include bank application 113 processing such a reload selection and generating an initialization command. Such an initialization command may be sent from bank application 113 to secure element 145 (e.g., via device application 103) on electronic device 100 for reloading reloadable credential A of secure element 145 at step 504. For example, bank application 113 may communicate with secure element 145 (e.g., via device application 103) at step 504 in order to request certain information that may be used for enabling such reloading. Such an initialization command provided to secure element 145 at step 504 may include at least one local PutPending command with a script as a command application protocol data unit ("APDU") that may request a cryptogram or any other suitable data from a particular credential applet provisioned on device 100, where such data may later be validated by an issuer or manager or any other suitable entity of system 1 remote from secure element 145 that may have initially provisioned that credential applet on secure element 145. Moreover, such initialization command data may be initially provided by bank application 113 to device application 103 along with identification of the App ID 159*c* of bank application 113, and device application 103 may confirm that App ID 159*c* is appropriately associated with the credential intended to receive the instruction of the initialization command data (e.g., that App ID 159*c* is associated with App ID 159*a* of reloadable credential applet 153*a* of SSD 154*a*) before providing that initialization command data to secure element 145.

In response to receiving such an initialization command, the reloadable credential applet 153*a* of SSD 154*a* may process the initialization command and respond with an initialization response at step 506 that may include at least one response APDU including a cryptogram or any other suitable data from that particular credential applet 153*a*, where such data may later be validated by an issuer or manager or any other suitable entity of system 1 remote from secure element 145 that may have initially provisioned that credential applet 153*a* on secure element 145. Such an initialization response may be provided to bank application 113 from secure element 145 (e.g., via device application 103), and then bank application 113 may transmit that initialization response along with any other suitable data as initialization results to bank server 310 at step 508. For example, such initialization results may include the cryptogram or any other suitable validating data from reloadable credential applet 153*a* as well as a request for a particular amount of currency or value to be reloaded with that reloadable credential applet (e.g., the amount selected at option 905*a* of FIG. 9C) and/or an indication of a particular funding source to be used to adjust the current balance of that reloadable credential applet (e.g., funding source G selected at option 903*a* of FIG. 9B). Secure element 145 (e.g., SSD 154*a* with credential applet 153*a*) may be configured to receive initialization command(s) at step 504 and provide initialization response(s) at step 506 without leveraging CRS kit 151.

Then, at step 510, bank server 310 may receive such initialization results from bank application 113 and may process such initialization results (e.g., in cooperation with any suitable subsystem of financial institution subsystem 350). Such processing of initialization results may include attempting to validate the cryptogram or any other suitable validation data that may be provided by reloadable credential applet 153*a* of SSD 154*a* as at least a portion of the initialization results. Then, if such attempted validation is successful, such processing of step 510 may also include generating reload data that may be an instruction indicative of an amount to be applied to the balance of the reloadable credential and/or indicative of the source that may fund or otherwise be associated with that adjustment to the balance of the reloadable credential. Such reload data may be transmitted to banking application 113 of device 100 at step 512, where such reload data may include at least one script (e.g., any scripts, any rotate keys (e.g., if necessary), and/or any other suitable administrative elements that may be used to update the balance of a reloadable credential card on device 100), such as a TopUp script, which may be in accordance with any suitable industry standard, such as GlobalPlatform. In some embodiments, the cryptogram or any other suitable validation data that may be provided by reloadable credential applet 153*a* of SSD 154*a* as at least a portion of the initialization results of step 508 may be configured to prove the identity of secure element 145 that is requesting the funds, and may enable financial institution subsystem 350 (e.g., an issuer) and/or server 310 to appropriately encrypt any suitable commands for secure element 145 (e.g., for the particular SSD 154*a*). In some embodiments, the cryptogram may be an actual key of reloadable credential applet 153*a* of SSD 154*a*, or, alternatively, the cryptogram may be a data set of any suitable length (e.g., 8 or 16-byte cryptogram) that may be generated using a key associated with reloadable credential applet 153*a* of SSD 154a (e.g., using the key with any suitable crypto function (e.g., algorithm) on any suitable information, such as a randomly generated number and/or some other data available to secure element 145 (e.g., available to reloadable credential applet 153a of SSD 154a, such as the current value of cash on the reloadable cash credential), such that the cryptogram may be validated by server 310, which may also have access to the key of reloadable credential applet 153a of SSD 154a. For example, prior to step 502 of process 500, server 310 may have generated and/or provisioned that key on secure element 145 (e.g., along with reloadable credential applet 153a of SSD 154a).

Next, in response to receiving such reload data from bank server 310 at step 512, bank application 113 may generate and transmit a related reload command at step 514 to secure element 145 (e.g., via device application 103) on electronic device 100 for reloading a reloadable credential of secure element 145. For example, in response to receiving a reload command from bank server 310 at step 512, bank application 113 may communicate with secure element 145 (e.g., via device application 103) at step 514 in order to request the reloading or other suitable updating of the balance of a particular reloadable credential card based on that received reload command Such a reload command provided to secure element 145 from bank application 113 at step 514 may include at least one local PutPending command as a command APDU that may provide the script that may have been received by bank application 113 from bank server 310. Such an APDU command may be configured to instruct reloadable credential applet 153a of SSD 154a to appropriately increase or decrease the value of balance 161a of that reloadable credential card on secure element 145 with the script command received from bank server 310. Moreover, such reload command data may be initially provided by bank application 113 to device application 103 along with identification of the App ID 159c of bank application 113, and device application 103 may confirm that App ID 159c is appropriately associated with the credential intended to receive the instruction of the reload command data (e.g., that App ID 159c is associated with App ID 159a of reloadable credential applet 153a of SSD 154a) before providing that reload command data to secure element 145.

In response to receiving such a reload command, the reloadable credential applet 153a of SSD 154a may process the reload command for validating the command and/or for appropriately increasing or decreasing the value of balance 161 a of that reloadable credential card on secure element 145 at step 516. For example, the reload command of step 514 may include validation data that may be leveraged by secure element 145 to validate that the reload data has been provided by a trusted source associated with reloadable credential applet 153a of SSD 154a (e.g., similarly to the validation data of initialization results of step 508 that may be validated by server 310). For example, in some embodiments, validation data of the reload command of step 514 may include a cryptogram that may be an actual key available to server 310 and reloadable credential applet 153a of SSD 154a, or, alternatively, the cryptogram may be a data set of any suitable length (e.g., 8 or 16-byte cryptogram) that may be generated using a key accessible to server 310 and reloadable credential applet 153a of SSD 154a (e.g., using the key with any suitable crypto function (e.g., algorithm) on any suitable information, such as a randomly generated number and/or some other data available to server 310 (e.g., such as the current value of cash on the reloadable cash credential, which may have been provided to server 310 at step 506/508 as described above), such that the cryptogram may be validated by applet 153a of SSD 154a, which may also have access to the key as well as that current value, for validating the reload command. In some embodiments, the reload command may be configured so as not to be replayable (e.g., so as not to be repeatedly used by device 100 for incrementing the value of the cash credential multiple times using a single reload command (e.g., based on a single funding event). For example, the reload command's validation data may be based on the current value of the reloadable cash credential (e.g., at the time of step 506), such that if secure element were to attempt to use the same reload command a second time after using the reload command a first time for changing the value of the reloadable cash credential, the "current value" of the reloadable cash credential would be different than what it was at step 506 and, thus, would be unable to validate the validation data of the reload command for its attempted second use. However, if the validation data of the reload command of step 514 is validated by secure element 145 (e.g., by reloadable credential applet 153a of SSD 154a), reloading of reloadable credential applet 153a may then be allowed. Such reloading of reloadable credential applet 153a may adjust the balance of funds available to reloadable credential applet 153a for use by device 100 (e.g., in a communication 15 with merchant subsystem 200). In response to such reloading at step 516, secure element 145 may generate and send a reload response to bank application 113 (e.g., via device application 103) at step 518 that may include at least one response APDU including a confirmation that balance 161a has been appropriately adjusted in accordance with the received reload command Secure element 145 (e.g., SSD 154a with credential applet 153a) may be configured to receive reload command(s) at step 514 and provide reload response(s) at step 518 without leveraging CRS kit 151.

In response to receiving such a reload response at step 518, bank application 113 may be configured to provide an indication of the adjusted balance 161 a to a user of device 100 (e.g., via I/O interface 114a) at step 520. For example, as shown by screen 190d of FIG. 9D, bank application 113 may be configured to present an updated current balance (i.e., "Value D*") of reloadable credential A, which is adjusted by the reloading of step 516 from the previous balance value D of screen 190a presented prior to steps 504-518. Additionally or alternatively, in response to receiving such a reload response at step 518, bank application 113 may be configured to transmit that response as reload results to bank server 310 at step 522. For example, such reload results may include any suitable reload confirmation data from reloadable credential applet 153a that may have been provided at step 518 as well as any other suitable data from bank application 113 that may be indicative of the particular amount of currency or value used to adjust that reloadable credential applet and/or an indication of a particular funding source used for that adjustment.

Then, at step 524, bank server 310 may receive such reload results from bank application 113 and may process such reload results (e.g., in cooperation with any suitable subsystem of financial institution subsystem 350). Such processing of reload results may include adjusting a balance of a particular funding source of financial institution subsystem 350 (e.g., a user's bank account (e.g., selected reload source G)) that may be used for the adjustment of the balance of reloadable credential applet 153a at step 516, which may complete the financial transaction of moving funds from an account of financial institution subsystem 350 to reloadable credential applet 153a or vice versa. Alternatively, such an adjustment of a balance of a particular funding source (e.g., selected reload source G) of financial institution subsystem 350 used for the adjustment of step 516 may be at least partially completed at step 510 such that funds may be adjusted at an account of financial institution subsystem 350 prior to adjusting the balance of reloadable credential applet 153a at step 516.

Figure 9A:
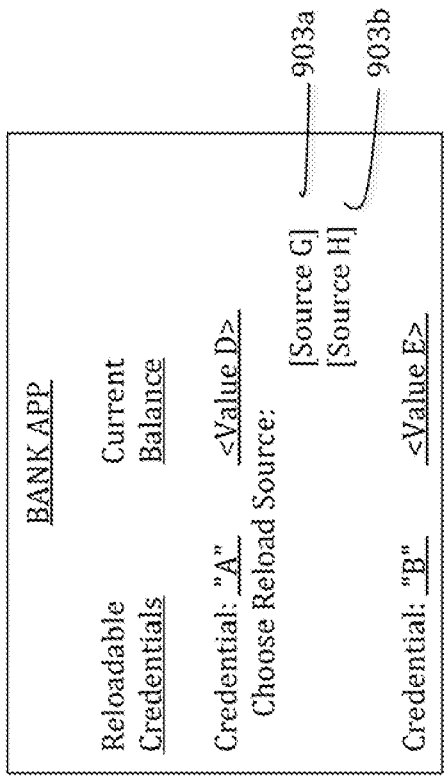
FIGS. 9A-9D are front views of screens of a graphical user interface of the electronic device of FIGS. 1-4 illustrating processes for using an online resource to manage reloadable credentials on the electronic device.
Figure 9B:
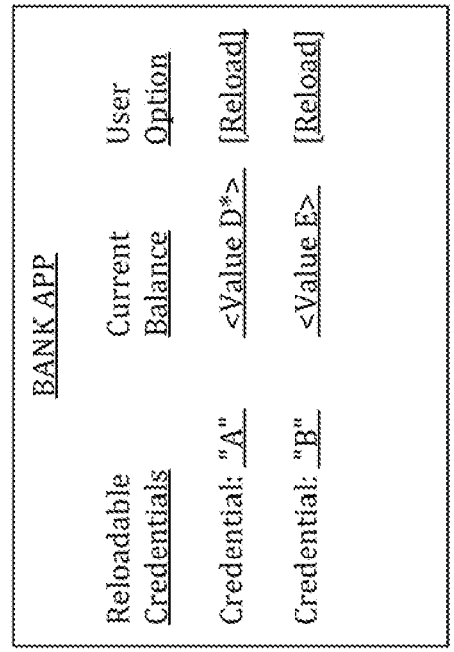
Figure 9C:
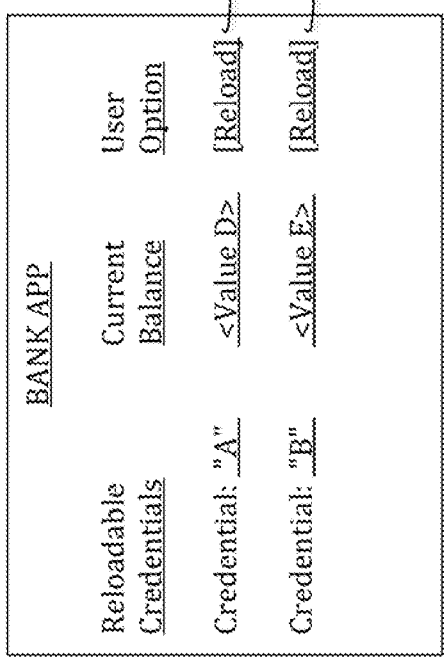
Figure 9D:
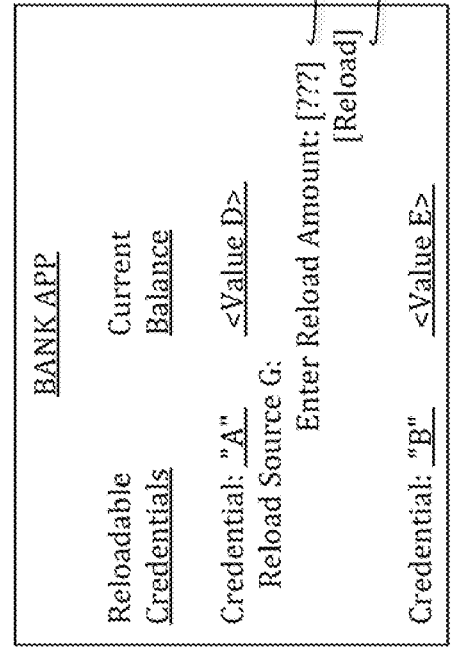

After a user of device 100 may provide reload selection at step 502 (e.g., by selecting a reloadable credential, a reload source, and a reload amount via the options of bank application 113 of FIGS. 9A-9C), the remaining steps of process 500 may occur transparent to the user. That is, once the user provides a selection of a reloadable credential, a reload source, and/or a reload amount at step 502, steps 504-524 may occur without any further user interaction (e.g., at least without any further user interaction with respect to that specific reloading) and may seem automatic and/or instantaneous to a user, whereby process 500 may appear to a user as if, after step 502, the status of credential data on secure element 145 has been automatically and/or instantaneously updated (e.g., as if the value of the balance 161a of reloadable credential A has been automatically and/or instantaneously adjusted on secure element 145) and that updated status may be provided to the user at step 520 based on that updating (e.g., by providing updated screen 190d of FIG. 9D). Therefore, process 500 may provide a more seamless user experience when a user is interfacing with or otherwise using an online resource 113 on device 100, where that online resource 113 may be associated with one or more reloadable credentials that have already been provisioned on device 100. Such management of one or more reloadable credentials on a secure element 145 of electronic device 100 through user interaction with an online resource 113 may increase the functionality of the online resource and/or enhance a user's experience with device 100 and its credential management abilities.

In some embodiments, secure element 145 may be utilized for any other suitable process between step 506 and step 514 of process 500, for example, such that the initialization command of step 504 and the reload command of step 514 of process 500 may be asynchronous with respect to the perspective of secure element 145. This may enable other processes, such as provisioning a third credential onto secure element 145 and/or utilizing credential applet 153b for a financial transaction via a communication 15, in between step 506 and step 514, rather than requiring secure element 145 be held in a polling mode (e.g., while waiting for a reload command at step 514). However, process 500 may be synchronous from the perspective of bank application 113 and/or bank server 310, whereby two put-pending commands (e.g., an initialization command of step 504 and a reload command of step 514) may be locally generated by bank application 113 with one or more scripts (e.g., GlobalPlatform scripts) to be executed by secure element 145. In some embodiments, secure element 145 may not be configured as a multi-process environment in a typical sense. A session may typically provide a unified context for a set of commands to execute and/or access the same state(s)/variable(s)/register(s)/counter(s), for example, even when behind the scenes CUP or any other suitable bank server 310 or financial institution subsystem 350 has swapped in and/or out other processes and saved their context. After a first script has been completed, in order not to block other secure element processes, the script may save off its "local" context. If another secure element operation for another application identifier ("AID") were to come in between the scripts, it may interfere with the "session" and/or potentially leave register(s)/counter(s)/state(s)/variable(s) in a different/ wrong state when the second script may be executed. Thus, one or more states may be saved such that they may be restored when a second script is invoked.

Process 500 may only require two commands for reloading a cash credential (i.e., initialization command of step 504 and reload command of step 514), thereby reducing the amount of network traffic (e.g., between device 100 and server 310 and/or between server 310 and financial institution subsystem 350) and/or thereby reducing the amount of special handling for any network errors. This may reduce the number of "round trips" that may be used to establish mutual authentication between the cash credential applet and server 310 of application 113.

It is understood that the steps shown in process 500 of FIG. 5 are merely illustrative and that existing steps may be modified or omitted, additional steps may be added, and the order of certain steps may be altered.

FIG. 6 is a flowchart of an illustrative process 600 for managing reloadable credentials on an electronic device using an online resource. Process 600 is shown being implemented by electronic device 100 (e.g., secure element 145, device app 103, and bank app 113), bank server 310, and financial institution subsystem 350. However, it is to be understood that process 600 may be implemented using any other suitable components or subsystems. Process 600 may provide a seamless user experience for managing reloadable credentials on secure element 145 of electronic device 100 using an online resource (e.g., bank application 113).

Process 600 may begin at step 602, where current balance data 652 of at least one reloadable credential provisioned on secure element 145 of device 100 may be accessed by bank application 113 (e.g., via device application 103). However, prior to step 602 of process 600, bank application 113 may first be loaded onto device 100 (e.g., via application store 420 of FIG. 1A), launched on device 100 (e.g., through user selection of the specific icon 182 labeled with a "Bank App" textual indicator 181 (i.e., specific icon 183) of FIG. 4), and/or used to appropriately authenticate a user of device 100 with bank application 113, as described above with respect to FIG. 5. At step 602, electronic device 100 may utilize any data associated with online resource 113 and/or associated with any account data received by online resource 113 from bank server 310 in order to access any appropriate data related to the secure element. For example, electronic device 100 (e.g., device application 103) may identify at least one, some, or all App IDs that may be associated with an online resource currently being used by device 100 (e.g., App ID 159c of bank application 113) and then may attempt to access secure element data indicative of at least one, some, or all credentials on secure element 145 that may be associated with one or more of the identified App IDs of the online resource. In some embodiments, device 100 may be configured to determine that App ID 159c is associated with currently running application 113 based on any suitable account data that may be received by device 100 (e.g., in response to a user of device 100 authenticating itself with server 310 via application 113). Alternatively or additionally, device 100 may be configured to determine that App ID 159c is associated with currently running application 113 based on any suitable information that may be locally stored on device 100 with respect to application 113 and/or that may be inherently associated with application 113 regardless of whether or not application 113 has received account data in response to user authentication. In response to identifying that App ID 159c is associated with currently running application 113, device 100 (e.g., device application 103) may be configured to communicate with secure element 145 or enact any other suitable procedure in order to access any suitable data with respect to any SSD 154 of secure element 145 that may be associated with App ID 159*c*. For example, if App ID 159*c* of bank application 113 matches or is otherwise deemed associated with App ID 159*a* of SSD 154*a*, information regarding the credential of SSD 154*a* (e.g., the current value of reloadable balance 161*a* of reloadable credential applet 153*a* of SSD 154*a*) may be provided by device application 103 to bank application 113 as accessed balance data 652 at step 602. Alternatively or additionally, if App ID 159*c* of bank application 113 matches or is otherwise deemed associated with App ID 159*b* of SSD 154*b*, information regarding the credential of SSD 154*b* (e.g., the current value of a reloadable balance (not shown) of reloadable credential applet 153*b* of SSD 154*b*) may be provided by device application 103 to bank application 113 as accessed balance data 652 at step 602.

At step 604, authenticated bank application 113 may be configured to access funding data 654 from bank server 310 using any suitable protocol (e.g., via communication path 75), where such funding data 654 may be indicative of one or more fund sources that may be leveraged by the user for adjusting the current balance of a reloadable credential on device 100. Bank server 310 may communicate with any suitable subsystem or subsystems of financial institution subsystem 350 at step 604 to access such funding data for bank application 113.

Next, at step 606, bank application 113 may be configured to provide current balance data 656 to a user of device 100 based on accessed balance data 652 of step 602. For example, as shown by screen 190*a* of FIG. 9A, a listing of at least one reloadable credential provisioned on secure element 145 that may be accessible by bank application 113, a current balance of each reloadable credential, and/or at least one selectable user option for reloading or otherwise adjusting a balance of a particular reloadable credential. Specifically, screen 190*a* may include a listing of reloadable credential "A" of applet 153*a* and reloadable credential "B" of applet 153*b*, as well as a listing of the status (e.g., current balance) of each reloadable credential accessible to bank application 113, as well as a listing of at least one management option for each account credential (e.g., "reload" management option 901*a* for facilitating the reloading (e.g., adjusting) of the current balance (e.g., "Value D") of reloadable credential A of SSD 154*a* of secure element 145, and/or "reload" management option 901*b* for facilitating the reloading (e.g., adjusting) of the current balance (e.g., "Value E") of reloadable credential B of SSD 154*b* of secure element 145).

By providing a current value of a reloadable balance 161*a* of reloadable credential applet 153*a* of SSD 154*a* at step 606 (e.g., as shown by screen 190*a* of FIG. 9A), bank application 113 may be configured to provide a user with the ability to choose to add additional funds to that reloadable credential for increasing the value of balance 161*a*. For example, also at step 606, in response to providing the current value of at least a reloadable balance 161*a* of reloadable credential applet 153*a* of SSD 154*a*, bank application 113 may be configured to provide a user with the ability to choose to reload funds for that credential applet and then receive such a user selection. In response to providing UI screen 190*a* of FIG. 9A at step 606, a user may interact with device 100 (e.g., with I/O interface 114*a*) in one of many possible ways (e.g., with a user input selection of one of options 901*a* and 901*b* as I/O input data 115*i* of FIG. 3) for managing a reloadable credential on secure element 145 by providing reload selection data 658 at step 608. For example, when a user may choose option 901*a* of FIG. 9A at step 608, bank application 113 may provide a user with at least one user-selectable option for at least one reload source with which the current balance of reloadable credential A of SSD 154*a* may be reloaded, for example, by providing screen 190*b* of FIG. 9B that may include a listing at least one reload source option (e.g., source G of option 903*a* and source H of option 903*b*) based on funding data 654 for selecting a particular reload source for use in reloading reloadable credential A. Such a reload source may be any suitable funding source associated with device 100 (e.g., associated with a user of device 100, such as through authentication with bank server 310 via bank application 113), which may include any suitable bank account managed by any suitable subsystem of financial institution subsystem 350 or any other suitable funding credential on secure element 145. Moreover, in response to bank application 113 providing UI screen 190*b* of FIG. 9B, a user may interact with device 100 (e.g., with I/O interface 114*a*) in one of many possible ways (e.g., with a user input selection of one of options 903*a* and 903*b* as I/O input data 115*i* of FIG. 3) for managing a reloadable credential on secure element 145 by providing additional reload selection data 658 at step 608. For example, when a user may choose reload source G of option 903*a* of FIG. 9B at step 608, bank application 113 may provide a user with at least one user-selectable option for entering the reload amount with which the current balance of reloadable credential A is to be reloaded, for example, by providing screen 190*c* of FIG. 9C that may include reload amount entry option 905*a* for enabling user selection of a particular reload amount for use in reloading reloadable credential A. Such an amount may be any suitable value that may be supported by the funds available to the selected reload source (e.g., source G). In some embodiments, the amount may be capped at any suitable amount (e.g., at 1,000 renminbi ("RMB") in the People's Republic of China). In some embodiments, the amount may be either a positive number (e.g., for increasing the current balance of funds available to reloadable credential A by moving funds from source G to credential A) or a negative number (e.g., for decreasing the current balance of funds available to reloadable credential A by moving funds from credential A to source G). Moreover, in response to bank application 113 providing UI screen 190*c* of FIG. 9C and receiving entry of a reload amount at option 905*a*, a user may interact with device 100 (e.g., with I/O interface 114*a*) in one of many possible ways for initiating the reloading of a reloadable credential on secure element 145 by providing additional reload selection data 658 at step 608. For example, once a user has entered a particular reload amount with option 905*a* of FIG. 9C, bank application 113 may provide a user with at least one user-selectable option for initiating the reloading of that amount with reloadable credential A, for example, by providing reload option 905*b* of FIG. 9C for enabling user reload selection of the particular reload amount of option 905*a* for use in reloading reloadable credential A. Therefore, following the particular example, user selection of reload option 905*b* of FIG. 9C at step 608 may initiate the reloading of the particular reload amount of option 905*a* to reloadable credential A with reload source G.

In response to receiving such a reload selection (e.g., selection of particular reloadable credential A of applet 153*a*) as at least a portion of data 658 at step 608, step 610 of process 600 may include bank application 113 processing such reload selection data 658 and generating and sending at least one initialization command 660. Initialization command 660 may be sent from bank application 113 to device application 103 on electronic device 100 for reloading reloadable credential A of secure element 145. Initialization command 660 may include identification of a particular credential on secure element 145 (e.g., reloadable credential A) and at least one local PutPending command with a script as a command application protocol data unit ("APDU") that may request a cryptogram or any other suitable data from a particular credential applet provisioned on device 100, where such data may later be validated by an issuer or manager or any other suitable entity of system 1 remote from secure element 145 that may have initially provisioned that credential applet on secure element 145. Moreover, initialization command 660 may be initially provided by bank application 113 to device application 103 along with identification of the App ID 159c of bank application 113.

At step 612, device application 103 may be configured to analyze initialization command 660 to confirm whether bank application 113 is allowed to communicate with a particular credential applet of secure element 145. Device application 103 may be configured to check the access rights of bank application 113 with respect to a particular credential applet in any suitable way at step 612. For example, device application 103 may compare App ID 159c of bank application 113 with a known list (e.g., look-up table) of App IDs of credential applets that are able to be accessed by an application with App ID 159c. If an approved match is detected by device application 103 at step 612 between App ID 159c of bank application 113 and App ID 159a of the particular credential applet 153a identified by initialization command 660, then device application 103 may be configured to transmit an appropriate initialization command 664 on to secure element 145 at step 614. In some embodiments, if an approved match is detected, device application 103 may further analyze each script of initialization command 660 to confirm that each script only address an approved secure element credential before transmitting initialization command 664. Such an initialization command 664 may include the same scripts as initialization command 660 but may be adequately configured to be communicated directly with secure element 145. Initialization command 664 may include at least two distinct command APDUs, including a first command indicative of a selection of a particular reloadable applet (e.g., applet 153a of reloadable credential A) and a second command indicative of an instruction for that selected reloadable applet to transmit a cryptogram or any other suitable validation data.

In response to receiving such an initialization command 664, the reloadable credential applet 153a of SSD 154a may process initialization command 664 and respond with an initialization response 668 at step 618 that may include at least one response APDU including a cryptogram or any other suitable data from that particular credential applet 153a, where such data may later be validated by an issuer or manager or any other suitable entity of system 1 remote from secure element 145 that may have initially provisioned that credential applet 153a on secure element 145. Secure element 145 (e.g., SSD 154a with credential applet 153a) may be configured to receive initialization command(s) 664 at step 614 and provide initialization response(s) 668 at step 618 without leveraging CRS kit 151. Initialization response 668 may be provided to device application 103 from secure element 145, and then provided to bank application 113 from device application 103 as initialization response 670. In some embodiments, prior to, concurrently with, or after step 618, secure element 145 (e.g., SSD 154a of responding credential applet 153a) may store any suitable temporary variables in a memory portion of secure element 145 (e.g., in a Flash memory portion of secure element 145 and not a RAM portion of device 100) at step 616. Such temporary variables may include any suitable data, such as counter data, session key data, any randomly generated numbers, any cryptogram data including any validation data provided by initialization response 668, and the like. This may enable secure element 145 to execute other put pending commands after initialization command 664 and before a later put pending command in the process of reloading credential A (e.g., reload command 682 of step 632). For example, as mentioned above, secure element 145 may not be configured as a multi-process environment in a typical sense. A session may typically provide a unified context for a set of commands to execute and/or access the same state(s)/variable(s)/register(s)/counter(s), for example, even when behind the scenes CUP or any other suitable bank server 310 or financial institution subsystem 350 has swapped in and/or out other processes and saved their context. After a first script has been completed, in order not to block other secure element processes, the script may save off its "local" context. If another secure element operation for another application identifier ("AID") were to come in between the scripts, it may interfere with the "session" and/or potentially leave register(s)/counter(s)/state(s)/variable(s) in a different/wrong state when the second script may be executed. Thus, one or more states may be saved such that they may be restored when a second script is invoked.

Next, at step 622, bank application 113 may receive and process initialization response 670 and then transmit that initialization response along with any other suitable data as initialization results 672 to bank server 310 at step 622 using any suitable communication protocol (e.g., via communication path 75). For example, such initialization results 672 may include the cryptogram or any other suitable validating data of initialization response 668 from reloadable credential applet 153a as well as a request for a particular amount of currency or value to be reloaded with that reloadable credential applet (e.g., the amount selected at option 905a of FIG. 9C) and/or an indication of a particular funding source to be used to adjust the current balance of that reloadable credential applet (e.g., funding source G selected at option 903a of FIG. 9B) as may have been provided to bank application 113 by selection data 658 at step 608.

Then, at step 624, bank server 310 may receive such initialization results 672 from bank application 113 and may process such initialization results 672 (e.g., in cooperation with any suitable subsystem of financial institution subsystem 350). Such processing of initialization results 672 may include attempting to validate the cryptogram or any other suitable validation data of initialization response 668 that may be provided by reloadable credential applet 153a of SSD 154a as at least a portion of initialization results 672 (e.g., as described above with respect to step 508/510 of process 500). Then, if such attempted validation is successful, such processing of step 624 may also include generating a reload instruction that may be indicative of an amount to be applied to the balance of the reloadable credential and/or that may be indicative of the source that may fund or otherwise be associated with that adjustment to the balance of the reloadable credential. Such a reload instruction may be transmitted by bank server 310 to banking application 113 of device 100 as reload data 676 at step 626 using any suitable communication protocol (e.g., via communication path 75), where such a reload command may include at least one script (e.g., any scripts, any rotate keys (e.g., if necessary), and/or any other suitable administrative elements that may be used to update the balance of a reloadable credential card on device 100), such as a TopUp script, which may be in accordance with any suitable industry standard, such as GlobalPlatform.

Next, in response to receiving such reload data 676 from bank server 310 at step 626, bank application 113 may generate and transmit a related reload command 678 to device application 103 at step 628 for reloading reloadable credential A of secure element 145. Reload command 678 may include identification of a particular credential on secure element 145 (e.g., reloadable credential A) and at least one local PutPending command with a script as a command APDU that may request a particular type of reloading adjustment be made to the balance of that particular credential applet provisioned on device 100 (e.g., a request to appropriately increase or decrease the value of balance 161*a* of that reloadable credential card on secure element 145 based on the script command received from bank server 310 as reload data 676). Moreover, reload command 678 may be initially provided by bank application 113 to device application 103 along with identification of the App ID 159*c* of bank application 113.

At step 630, device application 103 may be configured to analyze reload command 678 to confirm whether bank application 113 is allowed to communicate with a particular credential applet of secure element 145. Similarly to step 612, device application 103 may be configured to check the access rights of bank application 113 with respect to a particular credential applet in any suitable way at step 630. For example, device application 103 may compare App ID 159*c* of bank application 113 with a known list (e.g., look-up table) of App IDs of credential applets that are able to be accessed by an application with App ID 159*c*. If an approved match is detected by device application 103 at step 630 between App ID 159*c* of bank application 113 and App ID 159*a* of the particular credential applet 153*a* identified by reload command 678, then device application 103 may be configured to transmit an appropriate reload command 682 on to secure element 145 at step 632. In some embodiments, if an approved match is detected, device application 103 may further analyze each script of reload command 678 to confirm that each script only address an approved secure element credential before transmitting reload command 682. Such a reload command 682 may include the same scripts as reload command 678 but may be adequately configured to be communicated directly with secure element 145. Reload command 682 may include at least two distinct command APDUs, including a first command indicative of a selection of a particular reloadable applet (e.g., applet 153*a* of reloadable credential A) and a second command indicative of an instruction for that selected reloadable applet to adjust its balance (e.g., balance 161*a*) by a particular amount.

In response to receiving such a reload command 682, the reloadable credential applet 153*a* of SSD 154*a* may process reload command 682 for validating the source of the reload command (e.g., server 310) and/or appropriately increasing or decreasing the value of balance 161*a* of that reloadable credential card on secure element 145 at step 634 (e.g., as described above with respect to step 516 of process 500). Such reloading of reloadable credential applet 153*a* may adjust the balance of funds available to reloadable credential applet 153*a* for use by device 100 (e.g., in a communication 15 with merchant subsystem 200). In response to such reloading at step 634, secure element 145 may generate and send a reload response 686 at step 636 that may include at least one response APDU including a confirmation that balance 161*a* has been appropriately adjusted in accordance with the received reload command. Reload response 686 may be provided to device application 103 from secure element 145, and then provided to bank application 113 from device application 103 as reload response 688. Secure element 145 (e.g., SSD 154*a* with credential applet 153*a*) may be configured to receive reload command(s) 682 at step 632 and provide reload response(s) 686 at step 636 without leveraging CRS kit 151. In some embodiments, prior to, concurrently with, or after step 634, secure element 145 (e.g., SSD 154*a* of responding credential applet 153*a*) may reload or store any suitable temporary variables in a memory portion of secure element 145 (e.g., in a Flash memory portion of secure element 145 and not a RAM portion of device 100) at step 633. Such temporary variables may include any suitable data, such as counter data, session key data, any randomly generated numbers, any cryptogram data including any validation data provided by initialization response 668, and the like (e.g., as initially stored at step 616). This may enable secure element 145 to execute other put pending commands after initialization command 664 and before reload command 682 of step 632 in the process of reloading credential A. For example, as mentioned, secure element 145 may not be configured as a multi-process environment in a typical sense. A session may typically provide a unified context for a set of commands to execute and/or access the same state(s)/variable(s)/register(s)/counter(s), for example, even when behind the scenes CUP or any other suitable bank server 310 or financial institution subsystem 350 has swapped in and/or out other processes and saved their context. After a first script has been completed, in order not to block other secure element processes, the script may save off its "local" context. If another secure element operation for another application identifier ("AID") were to come in between the scripts, it may interfere with the "session" and/or potentially leave register(s)/counter(s)/state(s)/variable(s) in a different/wrong state when the second script may be executed. Thus, one or more states may be saved such that they may be restored when a second script is invoked.

In response to receiving such a reload response 688 at step 638, bank application 113 may be configured to provide an indication of the adjusted balance 161 *a* to a user of device 100 (e.g., via I/O interface 114*a*) as updated balance data 690 at step 640. For example, as shown by screen 190*d* of FIG. 9D, bank application 113 may be configured to present an updated current balance (i.e., "Value D\*") of reloadable credential A, which is adjusted by the reloading of step 634 from the previous balance value D of screen 190*a* presented prior to step 610. Additionally or alternatively, in response to receiving reload response 688 at step 638, bank application 113 may be configured to transmit response 688 as reload results 692 to bank server 310 at step 642 using any suitable communication protocol (e.g., via communication path 75 of system 1). For example, such reload results 692 may include any suitable reload confirmation data from reloadable credential applet 153*a* that may have been provided by reload response 686 at step 636 as well as any other suitable data from bank application 113 that may be indicative of the particular amount of currency or value used to adjust that reloadable credential applet and/or an indication of a particular funding source used for that adjustment.

Then, at step 644, bank server 310 may receive such reload results 692 from bank application 113 and may process such reload results 692 (e.g., in cooperation with any suitable subsystem of financial institution subsystem 350). Such processing of reload results 692 may include adjusting account data 694, such as a balance of a particular funding source of financial institution subsystem 350 (e.g., a user's bank account (e.g., selected reload source G)) that may be used for the adjustment of the balance of reloadable credential applet 153a at step 634, which may complete the financial transaction of moving funds from an account of financial institution subsystem 350 to reloadable credential applet 153a or vice versa. Alternatively, such an adjustment of a balance of a particular funding source (e.g., selected reload source G) of financial institution subsystem 350 used for the adjustment of step 634 may be at least partially completed at step 624 such that funds may be adjusted at an account of financial institution subsystem 350 prior to adjusting the balance of reloadable credential applet 153a at step 634.

After a user of device 100 may provide reload selection data 658 at step 608 (e.g., by selecting a reloadable credential, a reload source, and a reload amount via the options of bank application 113 of FIGS. 9A-9C), the remaining steps of process 600 may occur transparent to the user. That is, once the user provides a selection of a reloadable credential, a reload source, and/or a reload amount at step 608, steps 610-644 may occur without any further user interaction (e.g., at least without any further user interaction with respect to that specific reloading) and may seem automatic and/or instantaneous to a user, whereby process 600 may appear to a user as if, after step 608, the status of credential data on secure element 145 has been automatically and/or instantaneously updated (e.g., as if the value of the balance 161a of reloadable credential A has been automatically and/or instantaneously adjusted on secure element 145 (e.g., from value D to value D*)) and that updated status may be provided to the user at step 640 based on that updating (e.g., by providing updated screen 190d of FIG. 9D). Therefore, process 600 may provide a more seamless user experience when a user is interfacing with or otherwise using an online resource 113 on device 100, where that online resource 113 may be associated with one or more reloadable credentials that have already been provisioned on device 100. Such management of one or more reloadable credentials on a secure element 145 of electronic device 100 through user interaction with an online resource 113 may increase the functionality of the online resource and/or enhance a user's experience with device 100 and its credential management abilities.

In some embodiments, secure element 145 may be utilized for any other suitable process between step 618 and step 632 of process 600, for example, such that the initialization command of step 614 and the reload command of step 632 of process 600 may be asynchronous with respect to the perspective of secure element 145. This may enable other processes, such as provisioning a third credential onto secure element 145 and/or utilizing credential applet 153b for a financial transaction via a communication 15, in between step 618 and step 632, rather than requiring secure element 145 be held in a polling mode (e.g., while waiting for a reload command at step 632). However, process 600 may be synchronous from the perspective of bank application 113 and/or bank server 310, whereby two put-pending commands (e.g., initialization command 660 of step 610 and reload command 678 of step 628) may be locally generated by bank application 113 with one or more scripts (e.g., GlobalPlatform scripts) to be executed by secure element 145. For example, as mentioned, secure element 145 may not be configured as a multi-process environment in a typical sense. A session may typically provide a unified context for a set of commands to execute and/or access the same state(s)/variable(s)/register(s)/counter(s), for example, even when behind the scenes CUP or any other suitable bank server 310 or financial institution subsystem 350 has swapped in and/or out other processes and saved their context. After a first script has been completed, in order not to block other secure element processes, the script may save off its "local" context. If another secure element operation for another application identifier ("AID") were to come in between the scripts, it may interfere with the "session" and/or potentially leave register(s)/counter(s)/state(s)/variable(s) in a different/wrong state when the second script may be executed. Thus, one or more states may be saved such that they may be restored when a second script is invoked.

As mentioned, in some embodiments, server 310 and, thus, application 113 may be managed and/or otherwise at least partially under the control of a bank or other suitable entity of payment network 360 and/or issuing bank 370 of financial institution subsystem 350 or any other subsystem that may have control over a reloadable credential of device 100 (e.g., application 113 may be a banking application for China UnionPay ("CUP"), Bank of America, or the like, with which a user of device 100 may have an account that may be associated with one or more payment credentials (e.g., credit cards, debit cards, reloadable cash cards, etc.)). However, in other embodiments, application 113 may not be managed and/or otherwise at least partially under the control of a bank, yet, instead, may be managed and/or otherwise at least partially under the control of any other suitable entity, such as a transit authority (e.g., if the reloadable credential of device 100 is a transit pass for a subway network) or a restaurant (e.g., if the reloadable credential of device 100 is a cash card for a particular eating establishment), or the like. In such embodiments, application 113 may enable a user of device 100 to choose a funding mechanism for reloading the reloadable credential in any suitable manner. For example, any suitable "in-app" payment method using a payment credential of secure element 145 (e.g., Apple Pay™ as provided by Apple Inc. of Cupertino, Calif.), such as that described in co-pending, commonly-assigned U.S. patent application Ser. No. 14/481,526, filed Sep. 9, 2014, which is incorporated by reference herein in its entirety. Alternatively, a user may enter credit card payment information into application 113, such that application 113 may accept funds from a financial institution subsystem associated with that payment type during process 500 and/or process 600 such that server 310 of non-bank application 113 may acquire funding information. Such funding information may be included in reload data 676 by server 310 of application 113 as described above for use by application 113 and secure element 145. Server 310 of non-bank application 113 may then conduct a transaction with a financial institution subsystem for funding the reloading, and then the appropriate fund amount of that transaction may be included in reload data 676 by server 310 of non-bank application 113.

It is understood that the steps shown in process 600 of FIG. 6 are merely illustrative and that existing steps may be modified or omitted, additional steps may be added, and the order of certain steps may be altered.

Figure 7:
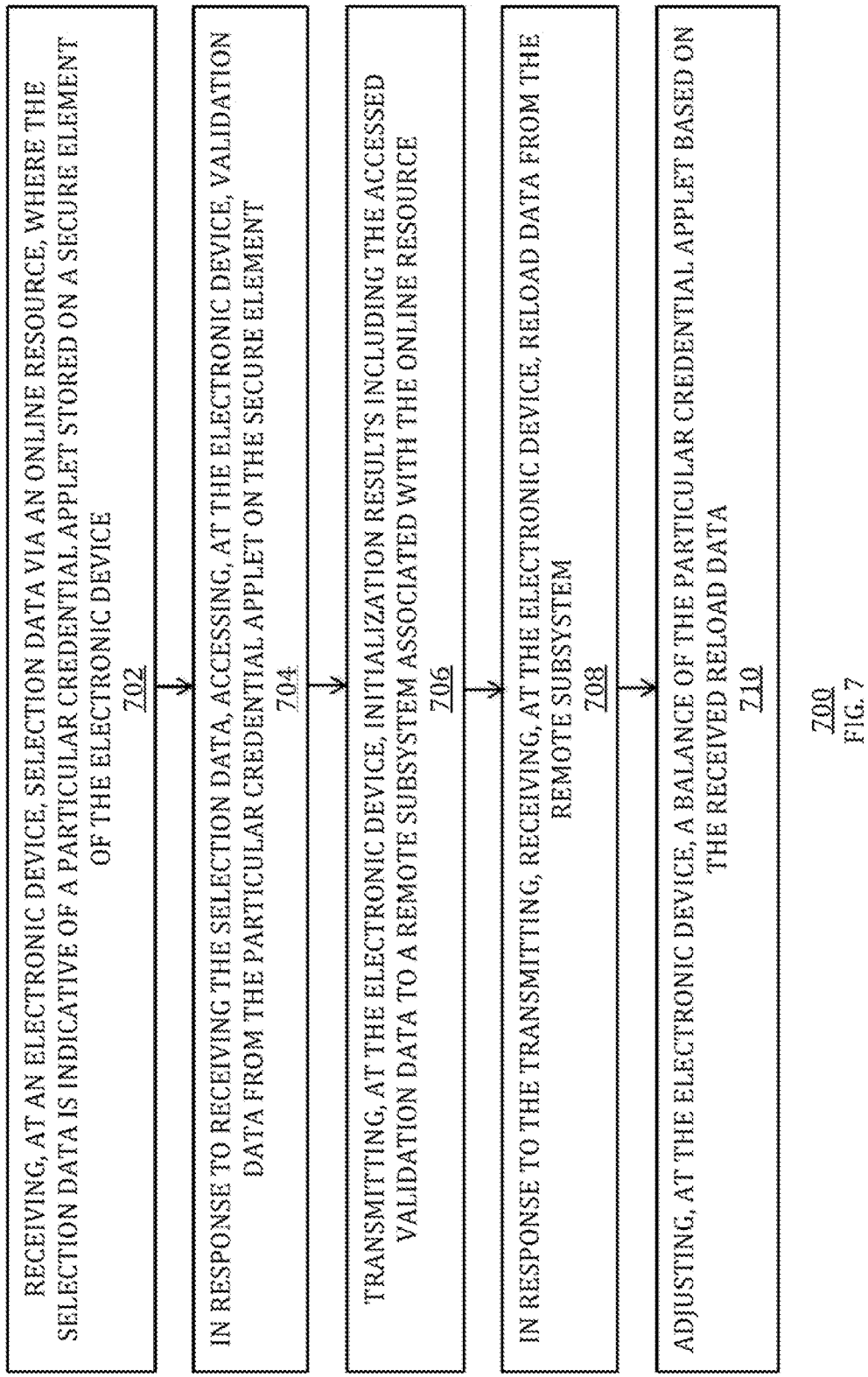

Description of FIG. 7

FIG. 7 is a flowchart of an illustrative process 700 for managing credentials on an electronic device. At step 702, process 700 may include receiving selection data at an electronic device via an online resource, where the selection data may be indicative of a particular credential applet stored on a secure element of the electronic device. For example, as described above, device 100 may receive reload selection data 658 via bank application 113, where selection data 658 may be indicative of reloadable credential A of secure element 145. Next, at step 704, in response to receiving the selection data at step 702, process 700 may include accessing, at the electronic device, validation data from the particular credential applet on the secure element. For example, as described above, device application 103 may access initialization response 668 with validation data from credential applet 153a of secure element 145. Next, at step 706, process 700 may include transmitting, at the electronic device, initialization results that may include the accessed validation data to a remote subsystem associated with the online resource. For example, as described above, device 100 may transmit initialization results 672 to bank server 310 associated with bank application 113, where initialization results 672 may include validation data from initialization response 668. Next, in response to the transmitting of step 706, process 700 may include, at step 708, receiving reload data from the remote subsystem at the electronic device. For example, as described above, electronic device 100 may receive reload data 676 from bank server 310. Next, at step 710, process 700 may include adjusting, at the electronic device, a balance of the particular credential applet based on the received reload data. For example, as described above, credential applet 153a may update a balance 161a based on reload command 682, which may be based on reload data 676.

It is understood that the steps shown in process 700 of FIG. 7 are merely illustrative and that existing steps may be modified or omitted, additional steps may be added, and the order of certain steps may be altered.

Figure 8:
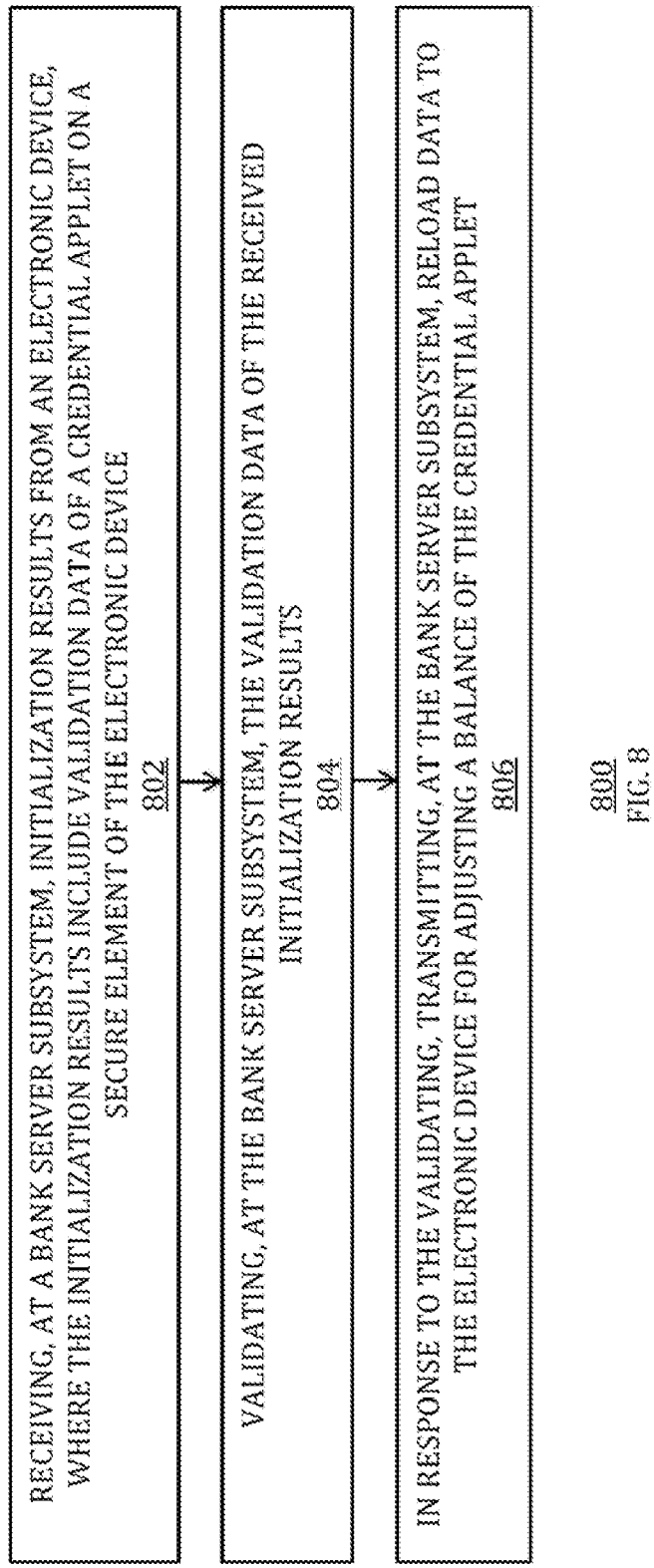

Description of FIG. 8

FIG. 8 is a flowchart of an illustrative process 800 for managing credentials on an electronic device. At step 802, process 800 may include receiving, with a bank server subsystem, initialization results from an electronic device, where the initialization results include validation data of a credential applet on a secure element of the electronic device. For example, as described above, bank server 310 may receive initialization results 672 from device 100 that may include validation data of initialization response 668 from credential applet 153a. Next, at step 804, process 800 may include validating, with the bank server subsystem, the validation data of the received initialization results. For example, as described above, bank server 310 may authenticate validation data from secure element 145. Next, at step 806, in response to the validating of step 804, process 800 may include transmitting, at the bank server subsystem, reload data to the electronic device for adjusting a balance of the credential applet. For example, as described above, bank server subsystem 310 may transmit reload data 676 to device 100 for adjusting a balance 161a of credential applet 153a.

It is understood that the steps shown in process 800 of FIG. 8 are merely illustrative and that existing steps may be modified or omitted, additional steps may be added, and the order of certain steps may be altered.

Further Description of FIG. 1, FIG. 1A, FIG. 2, FIG. 3, and FIG. 4

Although not shown, commercial entity subsystem 400 of FIG. 1A may be a secure platform system and may include a secure mobile platform ("SMP") broker component, an SMP trusted services manager ("TSM") component, an SMP crypto services component, an identity management system ("IDMS") component, a fraud system component, a hardware security module ("HSM") component, and/or a store component. One, some, or all components of commercial entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of commercial entity subsystem 400 may be managed by, owned by, at least partially controlled by, and/or otherwise provided by a single commercial entity (e.g., Apple Inc.) that may be distinct and independent from financial institution subsystem 350. The components of commercial entity subsystem 400 may interact with each other and collectively with both financial institution subsystem 350 and electronic device 100 for providing a new layer of security and/or for providing a more seamless user experience.

An SMP broker component of commercial entity subsystem 400 may be configured to manage user authentication with a commercial entity user account. Such an SMP broker component may also be configured to manage the life cycle and provisioning of credentials on device 100. An SMP broker component may be a primary end point that may control the user interface elements (e.g., elements of GUI 180) on device 100. An operating system or other application of device 100 (e.g., application 103, application 113, and/or application 143) may be configured to call specific application programming interfaces ("APIs") and an SMP broker component may be configured to process requests of those APIs and respond with data that may derive the user interface of device 100 and/or respond with application protocol data units ("APDUs") that may communicate with secure element 145 of NFC component 120 (e.g., via a communication path 65 between commercial entity subsystem 400 and electronic device 100). Such APDUs may be received by commercial entity subsystem 400 from financial institution subsystem 350 via a trusted services manager ("TSM") of system 1 (e.g., a TSM of a communication path 55 between commercial entity subsystem 400 and financial institution subsystem 350). An SMP TSM component of commercial entity subsystem 400 may be configured to provide GlobalPlatform-based services that may be used to carry out operations on device 100 in concert with financial institution subsystem 350. GlobalPlatform, or any other suitable secure channel protocol, may enable such an SMP TSM component to properly communicate and/or provision sensitive account data between secure element 145 of device 100 and a TSM for secure data communication between commercial entity subsystem 400 and financial institution subsystem 350.

An SMP TSM component of commercial entity subsystem 400 may be configured to use an HSM component of commercial entity subsystem 400 to protect its keys and generate new keys. An SMP crypto services component of commercial entity subsystem 400 may be configured to provide key management and cryptography operations that may be required for user authentication and/or confidential data transmission between various components of system 1. Such an SMP crypto services component may utilize an HSM component of commercial entity subsystem 400 for secure key storage and/or opaque cryptographic operations. A payment crypto service of an SMP crypto services component of commercial entity subsystem 400 may be configured to interact with an IDMS component of commercial entity subsystem 400 to retrieve on-file credit cards or other types of commerce credentials associated with user accounts of the commercial entity. Such a payment crypto service may be configured to be the only component of commercial entity subsystem 400 that may have clear text (i.e., non-hashed) information describing commerce credentials (e.g., credit card numbers) of its user accounts in memory. A commercial entity fraud system component of commercial entity subsystem 400 may be configured to run a commercial entity fraud check on a commerce credential based on data known to the commercial entity about the commerce credential and/or the user (e.g., based on data (e.g., commerce credential information) associated with a user account with the commercial entity and/or any other suitable data that may be under the control of the commercial entity and/or any other suitable data that may not be under the control of financial institution subsystem 350). Such a commercial entity fraud system component of commercial entity subsystem 400 may be configured to determine a commercial entity fraud score for the credential based on various factors or thresholds. Additionally or alternatively, commercial entity subsystem 400 may include a store component, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100, the Apple Online Store for buying various Apple products online, etc.). As just one example, such a store component of commercial entity subsystem 400 may be configured to manage and provide an application 113 to device 100 (e.g., via communications path 65), where application 113 may be any suitable application, such as a banking application, an e-mail application, a text messaging application, an internet application, or any other suitable application. Any suitable communication protocol or combination of communication protocols may be used by commercial entity subsystem 400 to communicate data amongst the various components of commercial entity subsystem 400 and/or to communicate data between commercial entity subsystem 400 and other components of system 1 (e.g., financial institution subsystem 350 via communications path 55 of FIG. 1A and/or electronic device 100 via communications path 65 of FIG. 1A).

As mentioned, and as shown in FIG. 2, electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to conducting financial transactions) and, in other embodiments, electronic device 100 may perform multiple functions (e.g., a device that conducts financial transactions, plays music, and receives and transmits telephone calls). Electronic device 100 may be any portable, mobile, hand-held, or miniature electronic device that may be configured to conduct financial transactions wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 2. For example, electronic device 100 may include any other suitable components or several instances of the components shown in FIG. 2. For the sake of simplicity, only one of each of the components is shown in FIG. 2.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., one or more subsystems or other components of system 1) using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

As a specific example, electronic device 100 may include a display output component as output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103, an application 113, and/or an application 143. Each application 103/113/143 may include, but is not limited to, one or more operating system applications, firmware applications, media playback applications, media editing applications, NFC low power mode applications, biometric feature-processing applications, or any other suitable applications. For example, processor 102 may load application 103/113/143 as a user interface program to determine how instructions or data received via an input component 110 or other component of device 100 may manipulate the way in which information may be stored and/or provided to the user via an output component 112. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications 5 between electronic device 100 and merchant subsystem 200 (e.g., a merchant payment terminal). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 370 Mbps), and may comply with any suitable standards, such as the TransferJet™ protocol. Communication between NFC component 120 and merchant subsystem 200 may occur within any suitable close range distance between device 100 and merchant subsystem 200 (see, e.g., distance D of FIG. 1A), such as a range of approximately 2 to 4 centimeters, and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFID") circuitry. NFC component 120 may provide a manner of acquiring merchandise information, transferring payment information, and otherwise communicating with an external device (e.g., terminal 220 of merchant subsystem 200).

NFC component 120 may include any suitable modules for enabling contactless proximity-based communication 5 between electronic device 100 and merchant subsystem 200. As shown in FIG. 2, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to merchant subsystem 200 as part of a contactless proximity-based or NFC communication 15. Additionally or alternatively, NFC data module 132 may be configured to contain, route, or otherwise receive any suitable data that may be received by NFC component 120 from merchant subsystem 200 as part of a contactless proximity-based communication 5.

NFC transceiver or NFC antenna 134 may be any suitable antenna or other suitable transceiver circuitry that may generally enable communication of communication 5 from NFC data module 132 to merchant subsystem 200 and/or to NFC data module 132 from subsystem 200. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, cellular, or GPS communication between electronic device 100 and another remote entity, while NFC component 120 may leverage antenna 116 to enable contactless proximity-based or NFC communication 5 between NFC data module 132 of NFC device module 130 and another entity (e.g., merchant subsystem 200). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication 5 to subsystem 200. For example, shared antenna 116 may require amplification from booster 136 before antenna 116 (e.g., a non-loop antenna) may be properly enabled for communicating contactless proximity-based or NFC communication 5 between electronic device 100 and merchant subsystem 200 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating NFC communication 5 between electronic device 100 and merchant subsystem 200. NFC processor module 142 may exist as a separate component, may be integrated into another chipset, or may be integrated with processor 102, for example, as part of a system on a chip ("SoC"). As shown in FIG. 2, NFC processor module 142 of NFC controller module 140 may be used to run one or more applications, such as an NFC low power mode or wallet application 143 that may help dictate the function of NFC component 120. Application 143 may include, but is not limited to, one or more operating system applications, firmware applications, NFC low power applications, or any other suitable applications that may be accessible to NFC component 120 (e.g., application 103/113). NFC controller module 140 may include one or more protocols, such as the Near Field Communication Interface and Protocols ("NFCIP-1"), for communicating with another NFC device (e.g., merchant subsystem 200). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information (e.g., communication 15) from NFC tags (e.g., from merchant subsystem 200) to NFC data module 132, a peer-to-peer mode for exchanging data (e.g., communication 5) with another NFC enabled device (e.g., merchant subsystem 200), and a card emulation mode for allowing another NFC enabled device (e.g., merchant subsystem 200) to read information (e.g., communication 5) from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., merchant subsystem 200). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 143).

NFC memory module 150 may operate in conjunction with NFC device module 130 and/or NFC controller module 140 to allow for NFC communication 5 between electronic device 100 and merchant subsystem 200. NFC memory module 150 may be embedded within NFC device hardware or within an NFC integrated circuit ("IC"). NFC memory module 150 may be tamper resistant and may provide at least a portion of a secure element. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC controller module 140 and NFC memory module 150 may independently or in combination provide at least a portion of a secure element 145, which may be tamper resistant. For example, such a secure element 145 may be configured to provide a tamper-resistant platform (e.g., as a single or multiple chip secure microcontroller) that may be capable of securely hosting applications and their confidential and cryptographic data (e.g., applet 153 and key 155) in accordance with rules and security requirements that may be set forth by a set of well-identified trusted authorities (e.g., an authority of financial institution subsystem and/or an industry standard, such as GlobalPlatform). NFC memory module 150 may be a portion of memory 104 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems. Secure element 145 may be a highly secure, tamper-resistant hardware component within a chip, which may be used for storing sensitive data or applications on electronic device 100. At least a portion of secure element 145 may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively or additionally, at least a portion of secure element 145 may be provided in an integrated circuit that may be embedded into electronic device 100 during manufacturing of device 100. Alternatively or additionally, at least a portion of secure element 145 may be provided in a peripheral device that can be plugged into, inserted into, or otherwise coupled to electronic device 100, such as a micro secure digital ("SD") memory card.

As shown in FIG. 2, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution (e.g., commercial entity subsystem 400 and/or financial institution subsystem 350) may store keys and/or other suitable information for creating or otherwise provisioning one or more credentials (e.g., commerce credentials associated with various credit cards, bank cards, gift cards, access cards, transit passes, digital currency (e.g., bitcoin and associated payment networks), etc.) on electronic device 100 (e.g., via communications component 106), for credential content management, and/or for security domain management. A specific supplemental security domain ("SSD") 154 (e.g., SSD 154a) may be associated with a particular TSM and at least one specific commerce credential (e.g., a specific credit card credential or a specific public transit card credential) that may provide specific privileges or payment rights to electronic device 100. For example, a first payment network subsystem 360 (e.g., Visa or CUP) may be the TSM for first SSD 154a and applet 153a of first SSD 154a may be associated with a commerce credential managed by that first payment network subsystem 360, while a second payment network subsystem 360 (e.g., MasterCard) may be the TSM for another SSD 154b.

Security features may be provided for enabling use of NFC component 120 (e.g., for enabling activation of commerce credentials provisioned on device 100) that may be particularly useful when transmitting confidential payment information, such as credit card information or bank account information of a credential, from electronic device 100 to merchant subsystem 200. Such security features also may include a secure storage area that may have restricted access. For example, user authentication via personal identification number ("PIN") entry or via user interaction with a biometric sensor may need to be provided to access the secure storage area (e.g., for a user to alter a life cycle state of a security domain element of the secure element). In certain embodiments, some or all of the security features may be stored within NFC memory module 150. Further, security information, such as an authentication key, for communicating with subsystem 200 may be stored within NFC memory module 150. In certain embodiments, NFC memory module 150 may include a microcontroller embedded within electronic device 100.

Terminal 220 of merchant subsystem 200 of FIG. 1A may include a reader for detecting, reading, or otherwise receiving NFC communication 15 from electronic device 100 (e.g., when electronic device 100 comes within a certain distance or proximity D of terminal 220). Accordingly, it is noted that NFC communication 15 between terminal 220 and electronic device 100 may occur wirelessly and, as such, may not require a clear "line of sight" between the respective devices. As mentioned, NFC device module 130 may be passive or active. When passive, NFC device module 130 may only be activated when within a response range D of a suitable reader of terminal 220. For instance, a reader of terminal 220 may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., credit card credential information) from NFC data module 132, via antenna 116 or antenna 134, to terminal 220 as NFC communication 15. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., credit card credential information) from NFC data module 132, via antenna 116 or antenna 134, to terminal 220 as NFC communication 15, rather than reflect radio frequency signals, as in the case of a passive NFC device module 130. Terminal 220 may be provided by a merchant of merchant subsystem 200 (e.g., in a store of the merchant for selling products or services directly to the user of device 100 at the store). While NFC component 120 has been described with respect to near field communication, it is to be understood that component 120 may be configured to provide any suitable contactless proximity-based mobile payment or any other suitable type of contactless proximity-based communication 15 between electronic device 100 and terminal 220. For example, NFC component 120 may be configured to provide any suitable short-range communication, such as those involving electromagnetic/electrostatic coupling technologies.

While NFC component 120 has been described with respect to near field communication, it is to be understood that component 120 may be configured to provide any suitable contactless proximity-based mobile payment or any other suitable type of contactless proximity-based communication 5 between electronic device 100 and merchant subsystem 200. For example, NFC component 120 may be configured to provide any suitable short-range communication, such as those involving electromagnetic/electrostatic coupling technologies.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

As mentioned, and as shown in FIG. 4, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 4, GUI 180 may be configured to display a first screen 190. One or more of user input components 110a-110i may be used to navigate through GUI 180. For example, one user input component 110 may include a scroll wheel that may allow a user to select one or more graphical elements or icons 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with a "Bank App" textual indicator 181 (i.e., specific icon 183) is selected, device 100 may launch or otherwise access a specific bank application and may display screens of a specific user interface that may include one or more tools or features for interacting with device 100 in a specific manner. For each application, screens may be displayed on display output component 112a and may include various user interface elements (e.g., screens 190a-190d of FIGS. 9A-9D). Additionally or alternatively, for each application, various other types of non-visual information may be provided to a user via various other output components 112 of device 100. The operations described with respect to various GUIs 180 may be achieved with a wide variety of graphical elements and visual schemes. Therefore, the described embodiments are not intended to be limited to the precise user interface conventions adopted herein. Rather, embodiments may include a wide variety of user interface styles.

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, Calif. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one haptic or tactile output component 112c (e.g., a rumbler), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 4, at least a portion of biometric input component 110i may be incorporated into or otherwise combined with input component 110a or any other suitable input component 110 of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to subsystem 200 via antenna 116 and/or antenna 134 (not shown in FIG. 4). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

Moreover, one, some, or all of the processes described with respect to FIGS. 1-9D may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are merely illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

As mentioned, an input component 110 of device 100 (e.g., input component 1100 may include a touch input component that can receive touch input for interacting with other components of device 100 via wired or wireless bus 118. Such a touch input component 110 may be used to provide user input to device 100 in lieu of or in combination with other input components, such as a keyboard, mouse, and the like.

A touch input component 110 may include a touch sensitive panel, which may be wholly or partially transparent, semitransparent, non-transparent, opaque, or any combination thereof. A touch input component 110 may be embodied as a touch screen, touch pad, a touch screen functioning as a touch pad (e.g., a touch screen replacing the touchpad of a laptop), a touch screen or touch pad combined or incorporated with any other input device (e.g., a touch screen or touch pad disposed on a keyboard), or any multi-dimensional object having a touch sensitive surface for receiving touch input. In some embodiments, the terms touch screen and touch pad may be used interchangeably.

In some embodiments, a touch input component 110 embodied as a touch screen may include a transparent and/or semitransparent touch sensitive panel partially or wholly positioned over, under, and/or within at least a portion of a display (e.g., display output component 112a). In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures. A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

As mentioned, electronic device 100 may drive a display (e.g., display output component 112a) with graphical data to display a graphical user interface ("GUI") 180. GUI 180 may be configured to receive touch input via a touch input component 110f. Embodied as a touch screen (e.g., with display output component 112a as I/O component 114a), touch I/O component 110f may display GUI 180. Alternatively, GUI 180 may be displayed on a display (e.g., display output component 112a) separate from touch input component 110f. GUI 180 may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110f, which may be associated with the graphical elements of GUI 180. In other embodiments, the user may perform gestures at one or more locations that are independent of the locations of graphical elements of GUI 180. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. Alternatively, when gestures are performed directly on a touch screen, a user may interact directly with objects on the touch screen, with or without a cursor or pointer being displayed on the touch screen. Feedback may be provided to the user via bus 118 in response to or based on the touch or near touches on a touch input component 110. Feedback may be transmitted optically, mechanically, electrically, olfactory, acoustically, or the like or any combination thereof and in a variable or non-variable manner.

Further Applications of Described Concepts

While there have been described systems, methods, and computer-readable media for managing reloadable credentials on an electronic device using an online resource, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method comprising:
at an electronic device:
receiving, via an online resource running on an application processor of the electronic device, selection data that is indicative of a particular credential applet on a secure element of the electronic device;
in response to the receiving the selection data, accessing, by the application processor, validation data from the particular credential applet on the secure element;
transmitting, by a communication component of the electronic device, initialization results comprising the accessed validation data to a remote subsystem;
in response to the transmitting, receiving, by the communication component, reload data from the remote subsystem;
generating, by the application processor, a reload command based on the reload data received from the remote subsystem;
transmitting, by the application processor and to the secure element, the reload command generated by the application processor;
receiving, by the secure element, the reload command from the application processor; and
adjusting, by the secure element, a balance of funds for the particular credential applet based at least in part on the reload command received from the application processor.

2. The method of claim 1, wherein:
the selection data is also indicative of a particular funding source; and
the initialization results further comprise information indicative of the particular funding source.

3. The method of claim 1, wherein:
the selection data is also indicative of a particular adjustment amount; and
the initialization results further comprise information indicative of the particular adjustment amount.

4. The method of claim 3, wherein the received reload data is indicative of the particular adjustment amount.

5. The method of claim 1, wherein the online resource comprises one of an online application running on the electronic device that corresponds to the remote subsystem or a website running on the electronic device that corresponds to the remote subsystem.

6. The method of claim 1, further comprising, prior to the receiving the selection data, authenticating a user of the electronic device with the online resource.

7. The method of claim 1, further comprising, prior to the receiving the selection data, presenting the balance of funds for the particular credential applet to a user of the electronic device with the online resource.

8. The method of claim 1, wherein the validation data comprises a cryptogram.

9. A non-transitory computer-readable medium storing computer-readable instructions that, when executed by one or more processors, cause the one or more processors to perform operations comprising:
receiving, at an electronic device and via an online resource running on an application processor of the electronic device, selection data that is indicative of a particular credential applet on a secure element of the electronic device;
in response to the receiving the selection data, accessing, by the application processor, validation data from the particular credential applet on the secure element;
transmitting, by a communication component of the electronic device, the accessed validation data from the electronic device to a remote subsystem;
in response to the transmitting, receiving, by the communication component, reload data from the remote subsystem;
generating, by the application processor, a reload command based at least in part on the reload data;
transmitting, to the secure element, the reload command;
receiving, by the secure element, the reload command from the application processor; and
adjusting, by the secure element, a balance of funds for the particular credential applet based at least in part on the reload command received from the application processor.

10. An electronic device comprising:
a memory;
a communication component;
at least one application processor configured to:
receive, via an online resource running on the at least one application processor, selection data that is indicative of a particular credential applet on a secure element of the electronic device;
in response to receipt the selection data, access, by the at least one application processor, validation data from the particular credential applet on the secure element;
transmit, by the communication component, initialization results comprising the accessed validation data to a remote subsystem;
in response to transmission of the initialization results, receive, by the communication component, reload data from the remote subsystem;
generate, by the application processor, a reload command based on the reload data received from the remote subsystem; and
transmit, by the application processor and to the secure element, the reload command generated by the application processor; and
the secure element configured to:
receive, by the secure element, the reload command from the at least one application processor; and
adjust, by the secure element, a balance of funds for the particular credential applet based at least in part on the reload command received from the at least one application processor.

11. The electronic device of claim 10, wherein the at least one processor is further configured to:
receive, prior to receipt of the selection data, account data from the remote subsystem;
present initial credential management option data based on the received account data; and
receive, via the online resource and in response to presenting the initial credential management option data, the selection data.

12. The electronic device of claim 11, wherein the at least one processor is configured to access the validation data from the particular credential applet on the secure element by:
sending an initialization command to the secure element in response to the received selection data; and
accessing validation data from the credential applet in response to the initialization command.

13. The electronic device of claim 12, wherein at least one other command is executed after execution of the sent initialization command and before the execution of the transmitted reload command.

14. The electronic device of claim 12, wherein the presenting the initial credential management option data comprises presenting the initial credential management option data on an input/output interface of the electronic device to a user of the electronic device.

15. The electronic device of claim 10, wherein the reload command comprises two put pending calls.

16. The electronic device of claim 10, further comprising presenting, by the application processor via the running online resource, updated credential management option data, the credential management option data having been updated based on the adjusted balance of funds for the credential applet.

17. The electronic device of claim 16, wherein the receiving the selection data comprises receiving, by the application processor via the running online resource, the selection data at an input/output interface from a user.

18. The electronic device of claim 10, wherein the running the online resource comprises one of running, by the application processor of the electronic device, an online application that corresponds to the remote subsystem or accessing, by the application processor of the electronic device, a website that corresponds to the remote subsystem.

19. The electronic device of claim 10, wherein:
the received selection data is further indicative of a funding source; and
the initialization results further comprise information indicative of the funding source.

20. The electronic device of claim 10, wherein:
the received selection data is further indicative of an adjustment amount;
the initialization results further comprise information indicative of the adjustment amount; and
the received reload data is indicative of the adjustment amount.

21. The electronic device of claim 10, further comprising, prior to the receiving the selection data, authenticating, by the running online resource, a user of the electronic device.

* * * * *